US012080227B2

(12) United States Patent
Lee et al.

(10) Patent No.: US 12,080,227 B2
(45) Date of Patent: *Sep. 3, 2024

(54) PIXELS AND DISPLAY APPARATUS COMPRISING SAME

(71) Applicant: SAPIEN SEMICONDUCTORS INC., Ulsan (KR)

(72) Inventors: Jae Hoon Lee, Busan (KR); Jin Woong Jang, Suwon-si (KR)

(73) Assignee: SAPIEN SEMICONDUCTORS INC., Ulsan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,429

(22) Filed: Sep. 11, 2023

(65) Prior Publication Data

US 2023/0419889 A1 Dec. 28, 2023

Related U.S. Application Data

(63) Continuation of application No. 17/763,429, filed as application No. PCT/KR2020/012331 on Sep. 11, 2020, now Pat. No. 11,817,041.

(30) Foreign Application Priority Data

Sep. 25, 2019 (KR) ........................ 10-2019-0118384
Nov. 4, 2019 (KR) ........................ 10-2019-0139742
(Continued)

(51) Int. Cl.
*G09G 3/32* (2016.01)

(52) U.S. Cl.
CPC ....... *G09G 3/32* (2013.01); *G09G 2300/0857* (2013.01); *G09G 2310/08* (2013.01); *G09G 2320/064* (2013.01); *G09G 2330/021* (2013.01)

(58) Field of Classification Search
CPC ............. G09G 3/32; G09G 2300/0857; G09G 2310/08; G09G 2320/064;
(Continued)

(56) References Cited

U.S. PATENT DOCUMENTS

| | | | |
|---|---|---|---|
| 5,990,629 | A | 11/1999 | Yamada et al. |
| 2002/0158832 | A1 | 10/2002 | Park et al. |

(Continued)

FOREIGN PATENT DOCUMENTS

| | | | |
|---|---|---|---|
| JP | 11-149280 | A | 6/1999 |
| KR | 10-2006-0004254 | A | 1/2006 |

(Continued)

OTHER PUBLICATIONS

Communication issued in the European Patent Office on Jan. 2, 2023, in corresponding European Patent Application No. 20869701.1.

(Continued)

*Primary Examiner* — Muhammad N Edun
(74) *Attorney, Agent, or Firm* — Sughrue Mion, PLLC

(57) ABSTRACT

The present invention is related to pixels and a display apparatus including: a display unit including a plurality of pixels; a signal control unit for generating a first voltage signal and a second voltage signal; a column driver connected to each of the pixels to transmit the first voltage signal to the pixel through a column line; and a row driver connected to each of the pixels to transmit the second voltage signal to the pixel through a row line, wherein the signal control unit generates the second voltage signal so that a voltage level of the second voltage signal rises to be higher than or equal to a predetermined level value during a non-emission period of the pixel.

8 Claims, 26 Drawing Sheets

(30) Foreign Application Priority Data

Mar. 11, 2020 (KR) ........................ 10-2020-0030387
Mar. 26, 2020 (KR) ........................ 10-2020-0037068

(58) Field of Classification Search
CPC ........... G09G 2330/021; G09G 3/2014; G09G 2300/0426; G09G 3/2003; G09G 2300/0842; G09G 2310/0235
See application file for complete search history.

(56) References Cited

U.S. PATENT DOCUMENTS

| | | | |
|---|---|---|---|
| 2005/0231624 | A1 | 10/2005 | Muramatsu et al. |
| 2008/0136765 | A1 | 6/2008 | Neugebauer |
| 2011/0043545 | A1 | 2/2011 | Huang |
| 2011/0063268 | A1 | 3/2011 | Knapp |
| 2013/0009933 | A1 | 1/2013 | Toyomura et al. |

FOREIGN PATENT DOCUMENTS

| | | | |
|---|---|---|---|
| KR | 10-2008-0001870 | A | 1/2008 |
| KR | 10-2010-0044255 | A | 4/2010 |
| KR | 10-2010-0053345 | A | 5/2010 |
| KR | 10-2015-0104099 | A | 9/2015 |
| KR | 10-1942466 | A | 4/2019 |
| WO | 2007/042973 | A1 | 4/2007 |
| WO | 2019/008262 | A1 | 1/2019 |

OTHER PUBLICATIONS

International Search Report of PCT/KR2020/012331 dated Nov. 3, 2020 [PCT/ISA/210].
Office Action issued in parent U.S. Appl. No. 17/763,429 mailed Mar. 23, 2023.
Notice of Allowance issued in parent U.S. Appl. No. 17/763,429 mailed Jul. 6, 2023.

| | | | | |
|---|---|---|---|---|
| RST | 1 | 0 | 0 | 0 |
| 1 Clock | 0 | 1 | 0 | 0 |
| 2 Clock | 0 | 0 | 1 | 0 |
| 3 Clock | 0 | 0 | 0 | 1 |

PIXELS AND DISPLAY APPARATUS COMPRISING SAME

CROSS REFERENCE TO RELATED APPLICATIONS

This application is a continuation of U.S. application Ser. No. 17/763,429 filed Mar. 24, 2022, which is a National Stage of International Application No. PCT/KR2020/012331 filed on Sep. 11, 2020, claiming priority based on Korean Patent Application No. 10-2019-0118384 filed on Sep. 25, 2019, Korean Patent Application No. 10-201.9-0139742 filed on Nov. 4, 2019, Korean Patent Application No. 10-2020-0030387 filed on Mar. 11, 2020 and Korean Patent Application No. 10-2020-0037068 filed on Mar. 26, 2020.

TECHNICAL FIELD

The present embodiments relate to a pixel and a display device including the same.

BACKGROUND

As the information society develops, the demand for display devices that display images are increasing, Various types of display devices such as liquid crystal display device (Liquid Crystal Display Device), plasma display device (Plasma Display Device), and organic light emitting display device (Organic Light Emitting Display Device) are being used. Recently, interest in a display device (hereinafter, referred to as a "micro display device") using a micro light emitting diode (μLED) is also increasing.

As excellent display device characteristics are required for Virtual Reality (VR), Augmented Reality (AR), and Mixed Reality (MR) technologies, the development of micro LED on Silicon or AMOLED on Silicon is increasing. In particular, there is an increasing demand for pixel size minimization for high resolution implementation.

Accordingly, when a pixel circuit is configured in a semiconductor, as the number of contacts connected between the pixel circuit and the line increases, the pick and place yield and efficiency decrease, and it may be difficult to implement a large-size display device. In order to improve the efficiency of transfer (Pick & Place), research on the structure of a display device to minimize the number of contact points is being conducted.

Meanwhile, in the related art, since a signal and power are separately input to a pixel circuit, and power is continuously supplied after power-on, a static current of the pixel circuit is configured to continuously flow. That is, since the conventional pixel circuit is implemented in a structure that consumes a static current, there is a problem in that it is a factor of abruptly increasing power consumption at high resolution.

In addition, when a pixel circuit is configured in a semiconductor, as the number of contacts connected between the pixel circuit and the line increases, the pick and place yield and efficiency decrease, and it may be difficult to implement a large-size display device. Accordingly, research for a structure of a display device to minimize the number of contacts required to improve the efficiency of pick & place is being conducted.

In addition, the pixel circuit of the conventional display device must transmit a signal required for each sub-pixel as a parallel signal in order to supply it. At this time, there has been a problem that a large area is consumed for metal routing due to the need to transmit many signals.

DETAILED DESCRIPTION OF THE INVENTION

Technical Problems to be Solved

An object of the present invention is to provide a display device using a driving method capable of optimizing power consumption in a pixel circuit.

An object of the present invention is to provide a display device for reducing the number of contacts to a pixel circuit.

An object of the present invention is to provide a display device for reducing the number of contacts by serially processing a signal from the outside in a pixel circuit.

Technical problems to be achieved in the present disclosure are not limited to the above-mentioned technical problems, and other technical problems not mentioned will be clearly understood by those skilled in the art to which the present invention belongs from the following descriptions.

Solution to Solving Problems

A display device according to an embodiment of the present invention may include: a display unit including a plurality of pixels; a signal controller generating a first voltage signal and a second voltage signal; a column driver connected to each of the pixels to transmit the first voltage signal to the pixel through a column line; and a row driver connected to each of the pixels to transmit the second voltage signal to the pixel through a row line, wherein the signal controller may generate the second voltage signal such that a voltage level of the second voltage signal rises to a predetermined level or more during a non-emission period of the pixel.

In addition, the first voltage signal may be a power supply voltage superimposed with a first signal, and the second voltage signal may be a ground voltage superposed with a second signal.

In addition, the first signal is an analog data signal, the second signal is a switch clock signal, and the signal controller may control the second voltage signal in a non-emission period of the pixel based on a predetermined duty ratio. The second voltage signal may be generated so that the voltage level rises above a predetermined level value.

In addition, the first signal is a signal for data generating and the second signal is a clock generating signal, and the signal controller is the second signal in the non-emission period of the pixel based on the predetermined duty ratio. The second voltage signal may be generated such that the voltage level of the voltage signal rises above a predetermined level value.

In addition, the preset level value may be less than a minimum level value of the first voltage signal and greater than or equal to a maximum level value of the second voltage signal.

Also, the non-emission period may be a period excluding the data writing period and the light emission period among the frame periods of the pixel.

A display device may include: a display unit having a plurality of pixels; each of the plurality of pixels includes a pixel circuit; an electrode disposed on a surface of the display unit in a first direction; a power supply for transmitting any one of a power supply voltage and a ground voltage to each of the pixel circuit and the electrode body; a column driver connected to each of the pixel circuits to transmit a first voltage signal to the pixel circuit through a column line; and a row driver connected to each of the pixel circuits to transmit a second voltage signal to the pixel circuit through a row line according to an embodiment of the present invention.

In addition, the electrode is arranged to be bonded to each of the pixel circuits, and outputs any one of the power supply voltages and the ground voltage to each of the pixel circuits.

In addition, the electrode body may be implemented to have a transparency greater than or equal to a predetermined value.

The display unit may further include a driving circuit board on which each of the pixel circuits is arranged, wherein the driving circuit board is disposed on a second direction surface opposite to the first direction surface of the display unit.

The power supply may output the power voltage to the electrode body and output the ground voltage to the pixel circuit, wherein the pixel circuit generates a first voltage signal based on a ground voltage and a first signal; generate a second voltage signal based on a second signal, and output the first voltage signal and the second voltage signal to a column driver and a row driver, respectively.

In this case, the first signal may be a signal for generating data, and the second signal may be a signal for generating a clock.

According to an embodiment of the present invention, a display device may include a plurality of pixels may include: at least one sub-pixel included in each of the plurality of pixels; a pixel circuit included in each of the plurality of pixels and respectively connected to the at least one sub-pixel; a clock generator connected to each of the pixel circuits to transmit a clock signal to the pixel circuit through a clock line; and a data driver connected to each of the pixel circuits to transmit a data signal to the pixel circuit through a data line. wherein the pixel circuit sequentially writes the data signal based on the clock signal In addition, the pixel circuit may include a flip-flop memory, wherein the flip-flop memory includes: a plurality of flip-flop units connected in series to correspond to each sub-pixel; and a flip-flop controller, wherein the plurality of flip-flop units and the flip-flop controller are connected in series.

In this case, the pixel circuit may sequentially write the data signal transmitted through the data line to correspond to the sub-pixels based on the control of the plurality of flip-flops, and the plurality of pixels may emit corresponding to the written data signal controlled by the flip-flop controller.

Other aspects, features, and advantages other than those described above will become apparent from the following detailed description, claims and drawings for carrying out the invention.

Effects of the Invention

A static power can be minimized in a display device implemented through reduced contact points according to an embodiment of the present invention.

Also, it may be possible to initialize a pixel circuit using a change in a voltage signal according to as aspect of the present invention.

According to the embodiment of the present invention, the number of contacts required for signal transmission in the pixel circuit can be reduced. That is, it may be possible to improve the yield and efficiency of transfer (Pick & Place) with a simplified contact structure. Accordingly, it is possible to implement a display device including small-sized pixels, thereby reducing the cost.

It is possible to stably supply a power without increasing the number of contacts required for transfer in the pixel circuit, and it is possible to provide an optimal power supply, thereby improving power consumption of the entire display device according to an aspect of the present invention.

In addition, in that a separate line is not required for the contact between the electrode body (or the power top plate) and the pixel circuit, the complexity of the pixel circuit can be solved, and stable power supply is possible according to aspect of the present invention.

In addition, since a transparent electrode body (or the power top plate) is covered with the top plate of the display unit, the display unit can be protected without impairing the display effect through the light emitting diode according to aspects of the present invention.

According to the embodiment of the present invention, the number of contacts required for signal transmission in the pixel circuit can be reduced. That is, it may be possible to increase the yield and efficiency of transferring, pick & place, with a simplified contact structure.

In addition, according to aspect(s) of the present invention, there is an effect that the metal routing area can be reduced by minimizing the number of routings required for conventional parallel signal processing. Accordingly, it is possible to realize a display device including small-sized pixels, thereby innovatively reducing the cost.

Furthermore, there is an effect that memory writing and light emission control are possible without a separate mode setting through serial signal processing according to aspect(s) of the present invention.

Of course, the effects are merely one example according to aspect(s) of the present invention thus, the scope of the present invention is not limited by these effects.

BEST MODE FOR CARRYING OUT THE INVENTION

Figure 1:
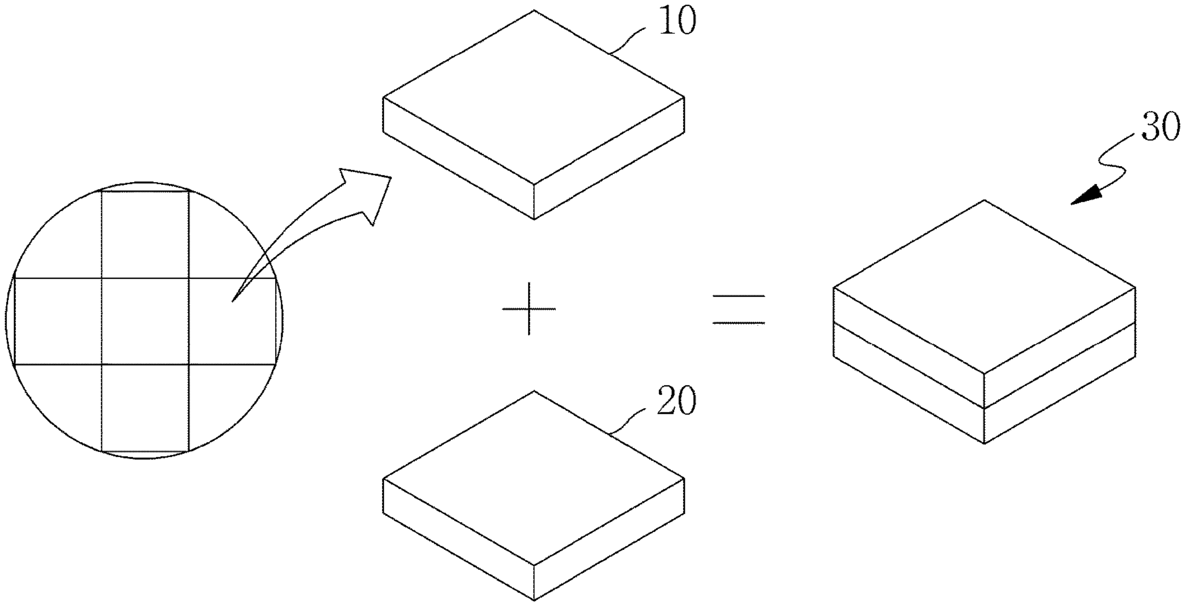
FIG. 1 is a schematic diagram illustrating a manufacturing process of a display device according to an embodiment of the present invention.

The present embodiments relate to a pixel and a display device including the same. The display device may include a plurality of pixels, a signal controller configured to generate a first voltage signal and a second voltage signal, a column driver connected to each pixel configured to transmit a first voltage signal to the pixel through a column line, and a row driver connected to each pixel configured to transmit a second voltage signal to the pixel through a row line, and the signal controller configured to generate the second voltage signal so that the voltage level of the second voltage signal rises above a predetermined level value during the non-emission period of the pixel.

EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In various embodiments of the present disclosure, “comprises.” or “have.” The term such as is intended to designate that there is a feature, number, step, operation, component, part, or combination thereof described in the specification, and is intended to indicate that one or more other features or numbers, steps, operation, component, part or but do not preclude the presence or addition of one or more other features, integers, steps, operations, elements, components, and/or groups thereof.

In various embodiments of the present invention, expressions such as “or” include any and all combinations of words listed together. For example, “A or B” may include A, may include B, or may include both A and B.

Although terms such as “first,” and “second,” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

When it is stated that a certain element is “coupled to” or “connected to” another element, the element may be directly coupled or connected to another element, or a new element may exist between both elements. Also, the terms “include”, “comprise”, and “have” as well as derivatives thereof, mean inclusion without limitation.

In an embodiment of the present disclosure, terms such as “module”, “unit”, “part”, etc. are terms for designating a component that performs at least one function or operation, and these components are hardware or software. These components may be implemented as hardware or software or may be implemented as a combination of hardware and software. In addition, a plurality of “modules”, “units”, “parts”, etc., each need to be implemented with individual specific hardware, except when necessary, it may be integrated into at least one module or chip and implemented as at least one processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, various embodiments of the present invention will be described in detail with reference to the accompanying drawings.

FIG. 1 is a schematic diagram illustrating a manufacturing process of a display device according to an embodiment of the present invention.

Referring to FIG. 1, the display device 30 may include a light emitting device array 10 and a driving circuit board 20. The light emitting device array 10 may be coupled to the driving circuit board 20 according to an exemplary embodiment.

The light emitting device array 10 may include a plurality of light emitting devices. The light emitting device may be a light emitting diode (LED). At least one light emitting device array 10 may be manufactured by growing a plurality of light emitting diodes on the semiconductor wafer SW.

Accordingly, the display device 30 can be manufactured by combining the light emitting device array 10 with the driving circuit board 20 without individually transferring the light emitting diodes to the driving circuit board 20.

A pixel circuit corresponding to each of the light emitting diodes on the light emitting device array 10 may be arranged on the driving circuit board 20. The light emitting diode on the light emitting device array 10 and the pixel circuit on the driving circuit board 20 may be electrically connected to form the pixel PX.

Figure 2:
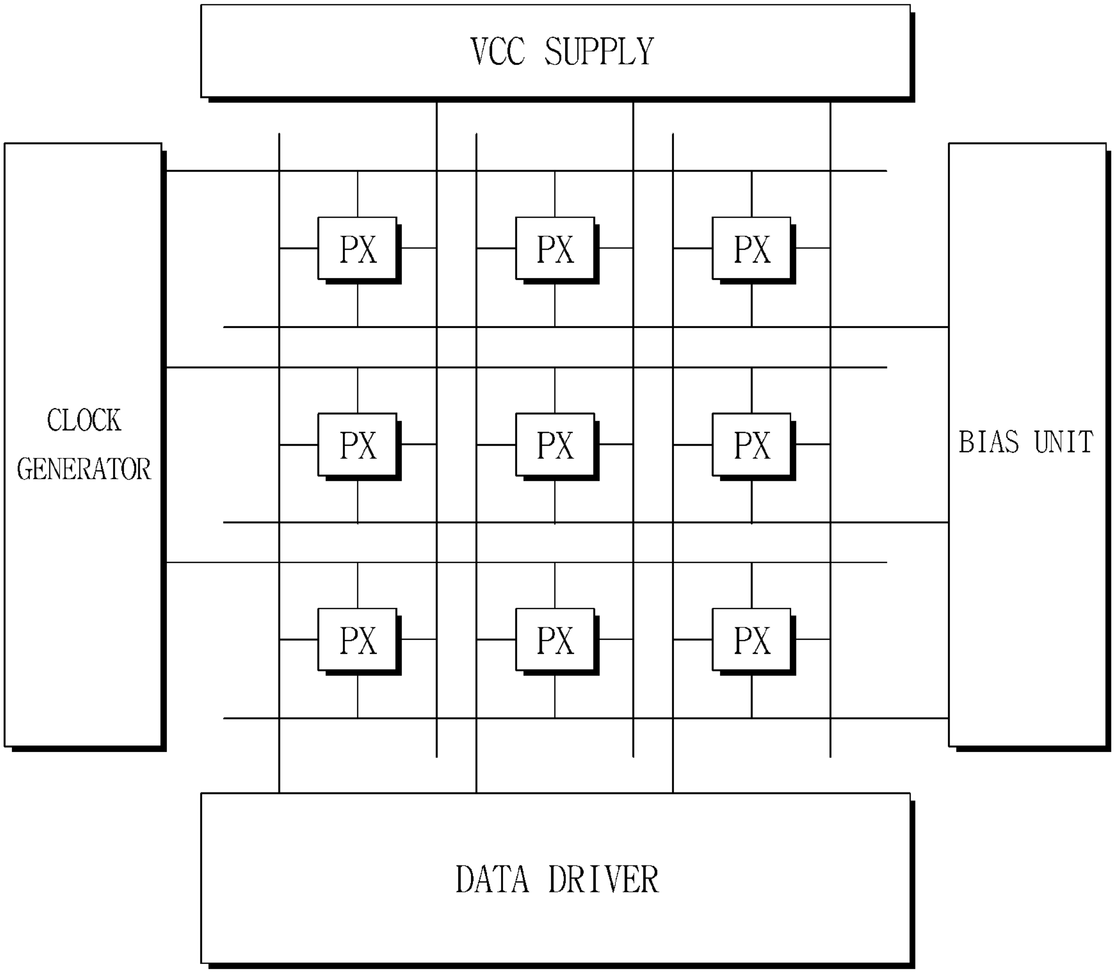
FIG. 2 shows the components of a display device for describing contacts connected to a conventional pixel circuit.

FIG. 2 shows the components of a display device for describing contacts connected to a conventional pixel circuit.

Referring to FIG. 2, the conventional display device may have four contacts required for pick and place of each pixel circuit. For example, a conventional pixel circuit may require four contacts to be respectively connected to a VCC voltage, a GND voltage, a row line (or scan/clock line), and a column line (or data line).

When the number of contacts is large as described above, it may adversely affect manufacturing yield and transfer efficiency, and may cause cost increase because it is difficult to reduce the pixel size.

Accordingly, a display device provides for reducing the number of the present contacts connected to a pixel circuit according to aspect(s) of the present invention.

Figure 3:
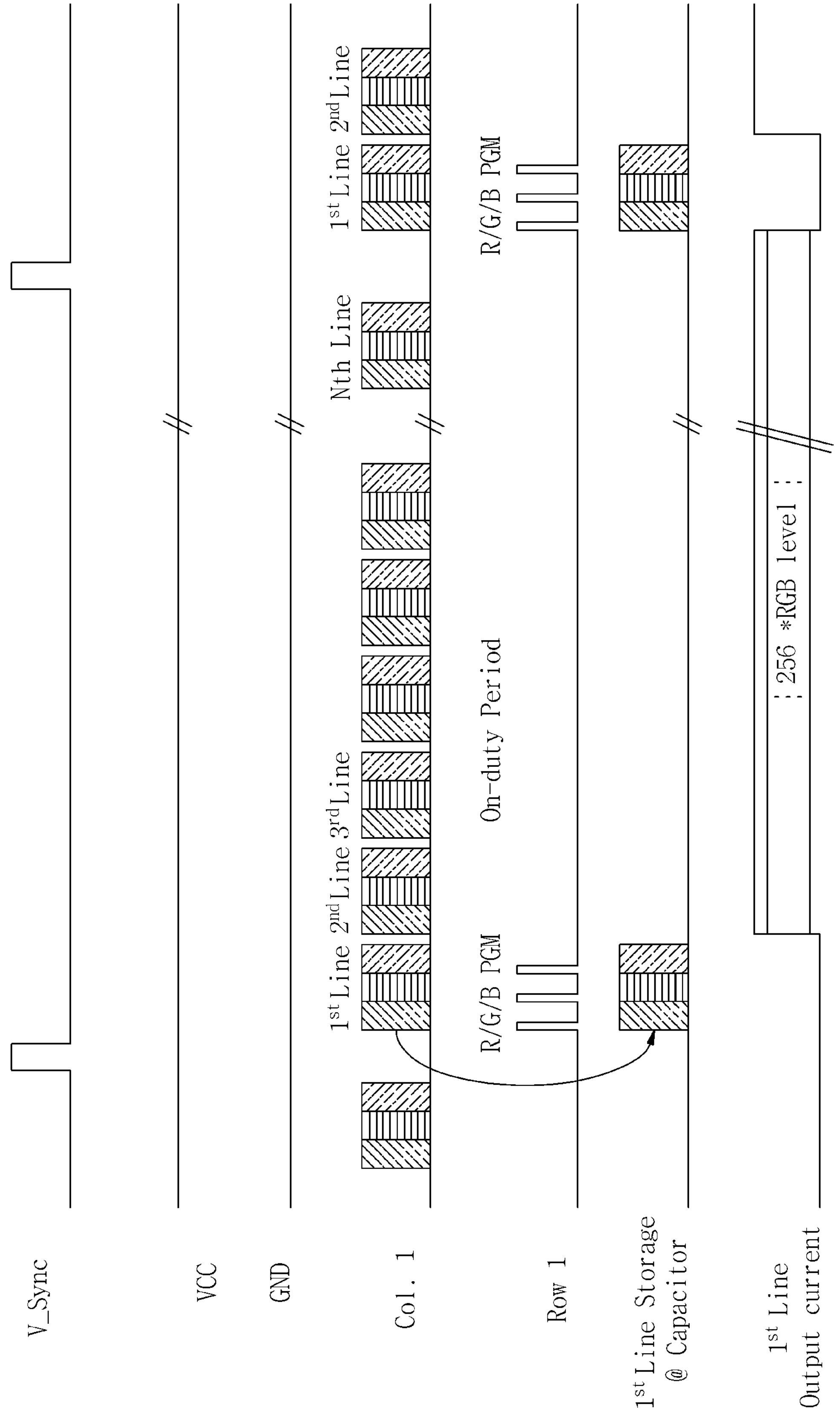
FIG. 3 shows a timing diagram of an analog pixel driving circuit using 4 contacts according to an embodiment of the present invention.

FIG. 3 shows a timing diagram of an analog driving pixel circuit using 4 contacts.

Referring to FIG. 3, the pixel circuit may receive a power supply voltage (VCC) and a ground voltage (GND) through a power line, receive analog data through a column line, and receive a switch clock signal through a row line. In this case, the pixel circuit may be a circuit configuration to drive each pixel of the display device 30.

In this case, the switch clock signal may include a clock for writing or programming signals for red (R), green (G), and blue (B) data included in the analog data signal to the corresponding sub-pixels, respectively. In this case, light emitting signals for the red (R), green (G), and blue (B) data may be adjusted by adjusting the voltage level (e.g., 256 RGB levels) applied to the corresponding light emitting device, respectively.

Red (R), green (G), and blue (B) data included in the analog data signal received through the first column line may be written into the pixel circuit of the first line in response to the switch clock signal.

The switch clock signal may include an emission clock for controlling to emit light based on analog data written in the pixel circuit. The pixel circuit may control the light emitting element (LED) to emit light in response to the analog data in response to the emission clock.

Meanwhile, the conventional pixel circuit continuously applies an output current including a static current to the first line during a frame period. That is, in the conventional pixel circuit, as the data signal and the power (VCC/GND) are input separately, power is continuously supplied after the power is turned on. Accordingly, a static current continuously flows in the pixel circuit after the light emission period.

As described above, since the conventional pixel circuit is implemented in a structure that consumes a static current, there is a problem in that it is a factor that rapidly increases power consumption at high resolution.

Figure 4:
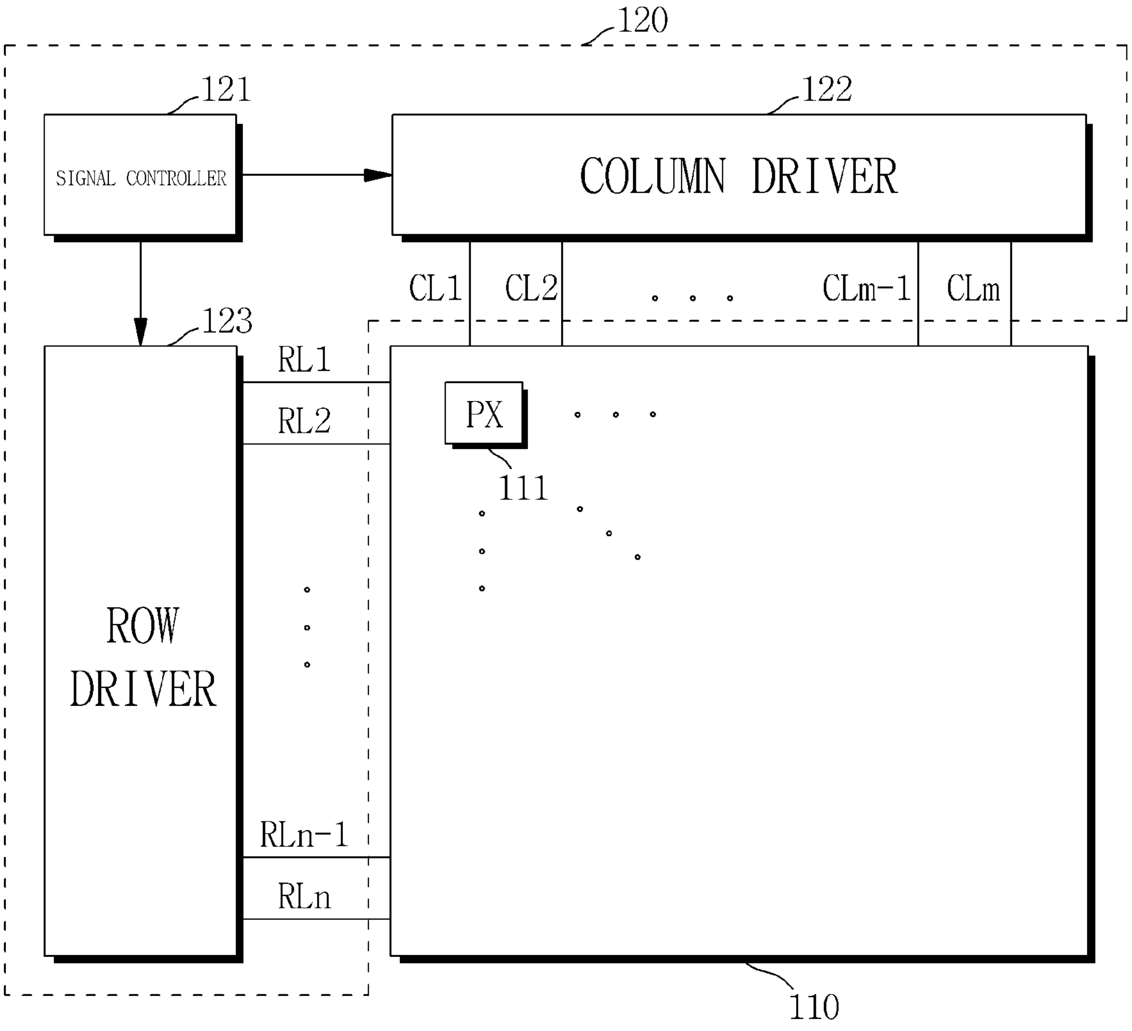
FIG. 4 is a schematic block diagram illustrating components of a display device according to an embodiment of the present invention.

FIG. 4 is a schematic block diagram illustrating components of a display device according to an embodiment of the present invention.

Referring to FIG. 4, the display device 30 may include a pixel unit 110 and a driver 120.

The pixel unit 110 may display an image using an m bit digital image signal capable of displaying 1 to $2^m$ gray scales. The pixel unit 110 may include a plurality of pixels PX arranged in various patterns such as a predetermined pattern, for example, a matrix type or a zigzag type. The pixel PX may emit one color, for example, one color among red, blue, green, and white. The pixel PX may also emit colors other than red, blue, green, and white.

The pixel PX may include a light emitting device. The light emitting device may be a self-luminous device. For example, the light emitting device may be a light emitting diode (LED). The light emitting device may be a light emitting diode (LED) having a micro to a nano unit size. The light emitting device may emit light at a single peak wavelength or may emit light at a plurality of peak wavelengths.

The pixel PX may further include a pixel circuit connected to the light emitting device. The pixel circuit may include at least one thin film transistor and at least one capacitor. The pixel circuit may be implemented by a semiconductor stacked structure on a substrate.

The pixel PX may operate in units of frames. One frame may be composed of a plurality of subframes. Each subframe may include a data writing period and a light emission period. During the data writing period, digital data of a predetermined bit may be applied to and stored in the pixel PX. A predetermined bit of digital data stored in the light emission period is read out in synchronization with a clock signal, and the digital data is converted into a PWM signal so that the pixel PX can express a gray level. The light emission period of the subframe may be the sum of time allocated to each bit of digital data.

The driver 120 may drive and control the pixel unit 110. The driver 120 according to an embodiment of the present invention may include a signal controller 121, a column driver 122, and a row driver 123.

The signal controller 121 may generate and control a signal to be transmitted to the pixel unit 110 through the column driver 122 and the row driver 123.

According to an embodiment of the present invention, the signal controller 121 may generate a first voltage signal and a second voltage signal, and transmit the first voltage signal and the second voltage signal to the column driver 122 and the row driver 123.

For example, the first voltage signal may be a signal in which the first signal is superimposed on the VCC voltage, and the second voltage signal may be a signal in which the second signal is superimposed on the ground voltage. In this case, the first signal may be a signal for generating data, and the second signal may be a signal for generating a clock. However, this is only an example, and the first signal may be a signal for generating a clock, and the second signal may be a signal for generating data at a ground voltage. Also, the first signal may be an analog data signal, and the second signal may be a switch clock.

The signal controller 121 may generate the second voltage signal to increase the voltage level of the second voltage signal to a predetermined level or more during a non-emission period of the pixel 111 to which the first voltage signal and the second voltage signal are supplied according to an embodiment of the present invention In detail, the signal controller 121 may generate the second voltage signal so that the voltage level of the second voltage signal becomes greater than or equal to a first value and less than a second value during the non-emission period of the pixel 111.

According to an exemplary embodiment, the first value may be the maximum voltage level among the second voltage during the period other than the non-emission period of the pixel 111, and the second value is a minimum voltage among the first voltage during the entire frame period.

For example, when the first voltage signal has a value between 18V and 24V during the entire frame period and the second voltage signal has a value between 2V and 8V during the period other than the non-light emission period, the first value is 8V and, the second value may be 18V. The signal controller 121 may generate the second voltage signal so that the voltage level of the second voltage is greater than or equal to 8V and less than 18V during the non-emission period.

According to an embodiment of the present invention, the signal controller 121 may generate and output the voltage level of the second voltage during the non-emission period to minimize wasted current due to the static current.

For example, the signal controller 121 may generate the second voltage signal such that a difference between the voltage level of the second voltage signal and the second value during the non-emission period of the pixel 111 is less than a predetermined value. In this case, the predetermined value may be a value corresponding to 50% of the difference between the first value and the second value, but this is only an example and may vary according to embodiments.

Specifically, when the first value is 8V, the second value is 18V, and the predetermined value is set to 50% of the difference between the first value and the second value, the predetermined value may be 5V. That is, the signal controller 121 may generate the second voltage signal so that the voltage level of the second voltage signal becomes any one of 13V or more and less than 18V during the non-emission period.

In this case, the non-emission period may be a period excluding the data writing period and the light emission period in the frame period of the pixel. Meanwhile, the signal controller 121 may generate a second voltage corresponding to the non-emission period based on a preset frame duty ratio. That is, the signal controller 121 may determine a period corresponding to a predetermined duty ratio among periods excluding the data writing period as the light emission period, and increases the voltage level of the second voltage signal corresponding to the other periods.

Specifically, the signal control unit 121 may generate a PWM clock signal for a period corresponding to a predetermined duty ratio to control the light emission of the light emitting device and generate to increase the voltage level of the second voltage signal more than a predetermined value during the remaining period.

The column driver 122 and the row driver 123 may transmit the first voltage signal and the second voltage signal to the pixel unit 110 through the column lines CL1 to CLm and the row lines RL1 to RLn, respectively. The pixel circuit included in the pixel 111 may generate data and clocks corresponding to the first voltage signal and the second voltage signal.

Figure 5:
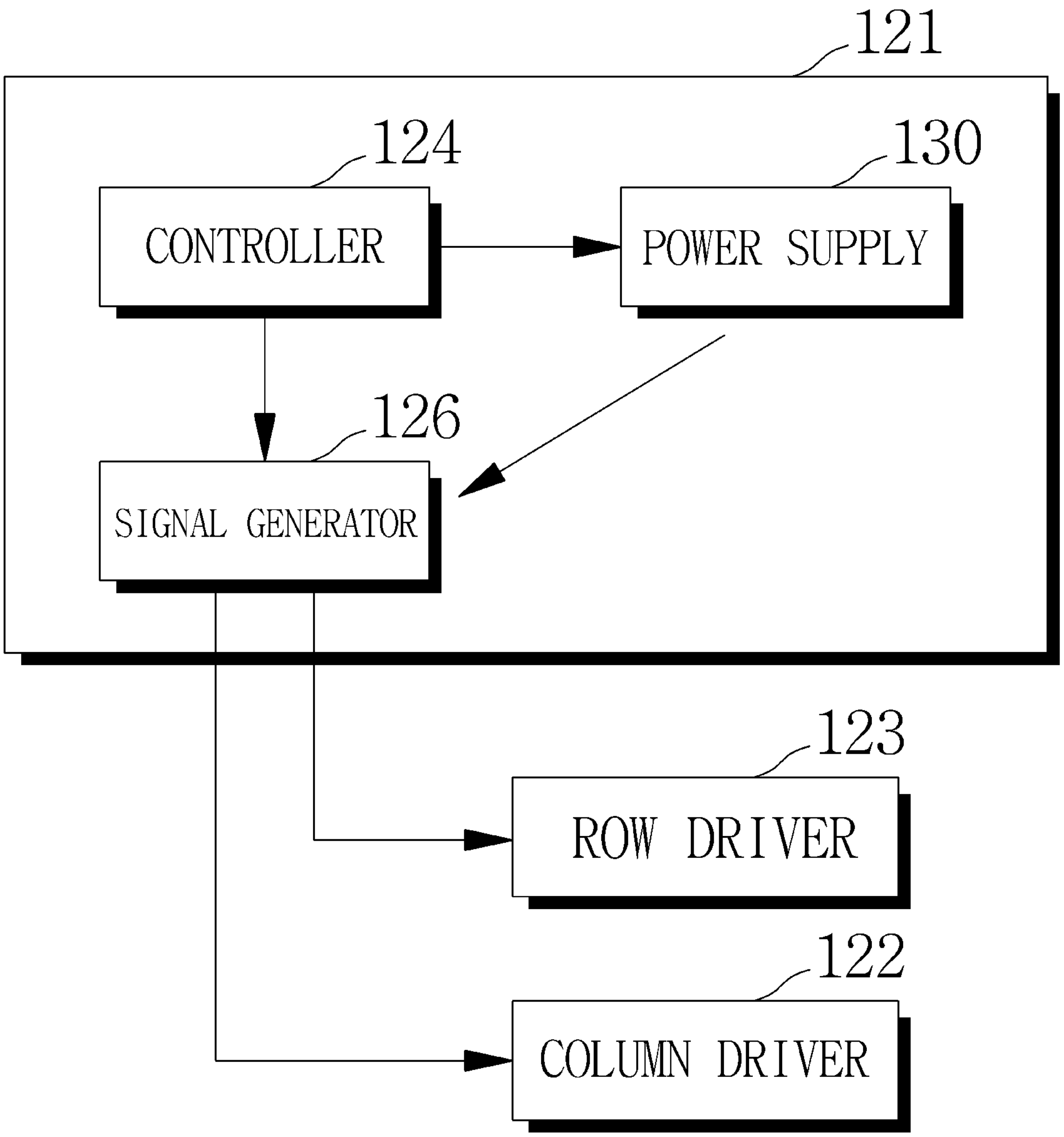
FIG. 5 is a block diagram for explaining the components of a signal controller according to an embodiment of the present invention.

FIG. 5 is a block diagram for explaining the components of a signal controller according to an embodiment of the present invention.

Referring to FIG. 5, the signal controller 121 may include a controller 124, a power supply 130, and a signal generator 126 according to aspect(s) of the present invention.

The controller 124 may generate a first voltage signal including a data signal and a second voltage signal including a clock signal by controlling the power supply 130 and the signal generator 126.

The first voltage signal of the present invention may be a power supply voltage superimposed with a first signal, and the second voltage signal may be a ground voltage superposed with a second signal.

According to an embodiment, the first voltage signal may be a signal for generating data superimposed on a power supply voltage, and the second voltage signal may be a signal for generating a clock superimposed on a ground voltage.

However, it is only an example according to an aspect of the present invention, and the first voltage signal may be a signal for generating a clock superimposed on the power supply voltage, and the second voltage signal may be a signal for generating data superimposed on a ground voltage. As another example, the first voltage signal may have data superimposed on the power supply voltage, and the second voltage signal may be the ground voltage with the switch clock signal superimposed.

Specifically, the controller 124 may control the power supply 130 to output the power voltage VCC and the ground voltage GND. The control unit 124 may control the signal generation unit 126 to superimpose the first signal (e.g., a signal for generating a clock) and a second signal (e.g., a signal for generating data) on each of the supply voltage VCC and ground voltage GND.

In this case, the signal for generating the clock and the signal for generating the data may be detected according to a predetermined rule in the pixel circuit included in the pixel 111, and the pixel circuit may generate the data and the clock in response to a predetermined rule.

According to an embodiment of the present invention, the first signal may be an analog data signal, and the second signal may be a switch clock signal. In this case, the second signal may be a switch clock corresponding to the data writing period and the light emission period, and the pixel circuit may perform an operation corresponding thereto.

Figure 6:
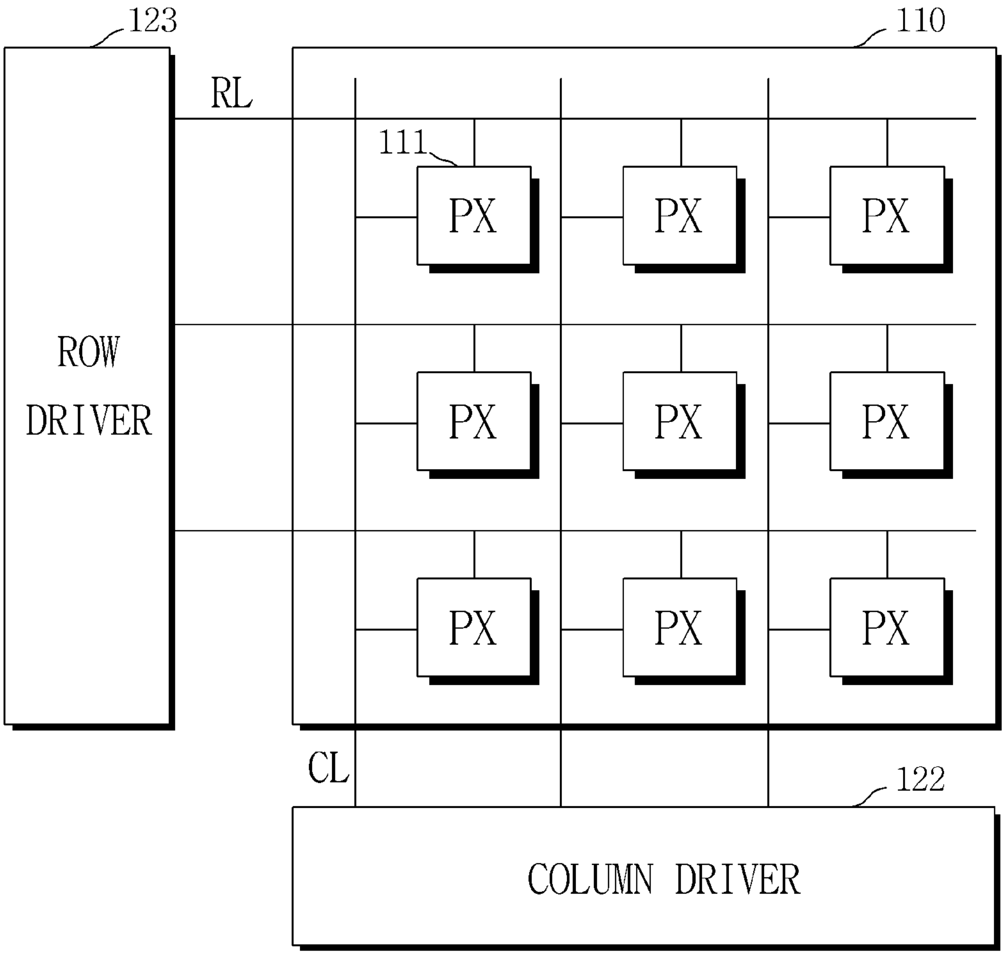
FIG. 6 illustrates a display device with reduced contacts connected to a pixel circuit according to an embodiment of the present invention.

FIG. 6 illustrates a display device having a reduced number of contacts connected to a pixel circuit according to an embodiment of the present invention.

Referring to FIG. 6, the pixel 111 of the pixel unit 110 may include a contact connected to the row line RL connected to the row driver 123 and a contact connected to the column line CL connected to the column driver 122 according to aspect(s) of the present invention.

The column driver 122 may transmit a first voltage signal to the pixel 111, and the row driver 123 may transmit a second voltage signal to the pixel 111. For example, the column driver 122 may transmit a signal in which the data generation signal is superimposed on the power voltage VCC to the pixel 111, and the row driver 123 may transmit a signal in which the clock generation signal is superimposed on the ground voltage GND to the pixel 111. In another embodiment, the column driver 122 may transmit a signal in which the clock generation signal is superimposed on the power voltage VCC to the pixel 111, and the row driver 123 may transmit a signal in which the data generation signal is superimposed on the ground voltage GND to the pixel 111.

In another embodiment, the column driver 122 may transmit a signal in which the data generation signal is superimposed on the ground voltage GND to the pixel 111, the row driver 123 may transmit a signal in which a clock generation signal is superimposed on the power voltage VCC to the pixel 111.

In another embodiment, the column driver 122 may transmit a signal in which the clock generation signal is superimposed on the ground voltage GND to the pixel 111 and the row driver 123 may transmit a signal in which the data generation signal is superimposed on the power voltage VCC to the pixel 111.

That is, the display device 30 may transmit the data signal and the clock signal by overlapping the power supply voltage and the ground voltage, thereby reducing the number of separate lines for the data and/or clock signal. It can be implemented through a reduced number of contacts compared to the conventional display device according to aspect(s) of the present invention FIG. 7 shows a timing diagram of an analog driving pixel circuit of a display device according to an embodiment of the present invention.

Figure 7:
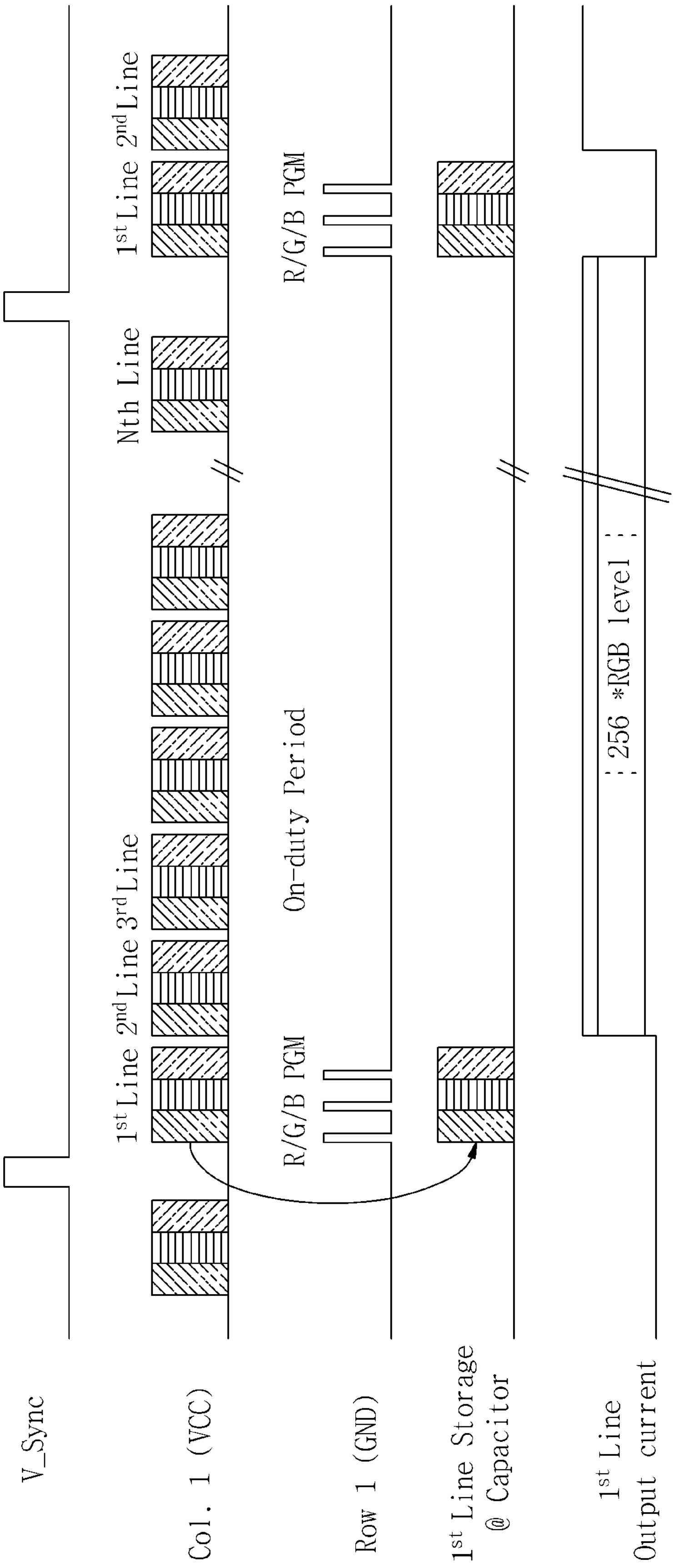
FIG. 7 shows a timing diagram of an analog pixel driving circuit of a display device according to an embodiment of the present invention.

Referring to FIG. 7, the pixel circuit may receive a first voltage signal through a column line and a second voltage signal through a row line. According to an embodiment of the present invention, the first voltage signal may be a power supply voltage VCC superimposed with analog data, and the second voltage signal may be a ground voltage GND superimposed with a switch clock signal.

The analog data may include information about each voltage level for illuminance control for each of red (R), green (G), and blue (B). The switch clock signal may include a clock for writing or programming the analog data to subpixels corresponding to signals for red (R), green (G) and blue (B) data included in the analog data signal, respectively. In this case, the illuminance of the signals for the red (R), green (G), and blue (B) data may be adjusted by adjusting the voltage level (e.g., 256 RGB level) applied to the corresponding light emitting device, respectively.

Red (R), green (G), and blue (B) data included in the first voltage signal received through the first column line may be written in the pixel circuit of the first line in response to the switch clock signal.

The switch clock signal may include an emission clock for controlling to emit light based on analog data written in the pixel circuit. The pixel circuit may control the light emitting element (LED) to emit light in response to the analog data in response to the emission clock.

The number of contacts required for signal transmission in the pixel circuit can be reduced according to an embodiment of the present invention. That is, it may be possible to increase the yield and efficiency of transfer (i.e., pick & place) with a simplified contact structure.

Figure 8:
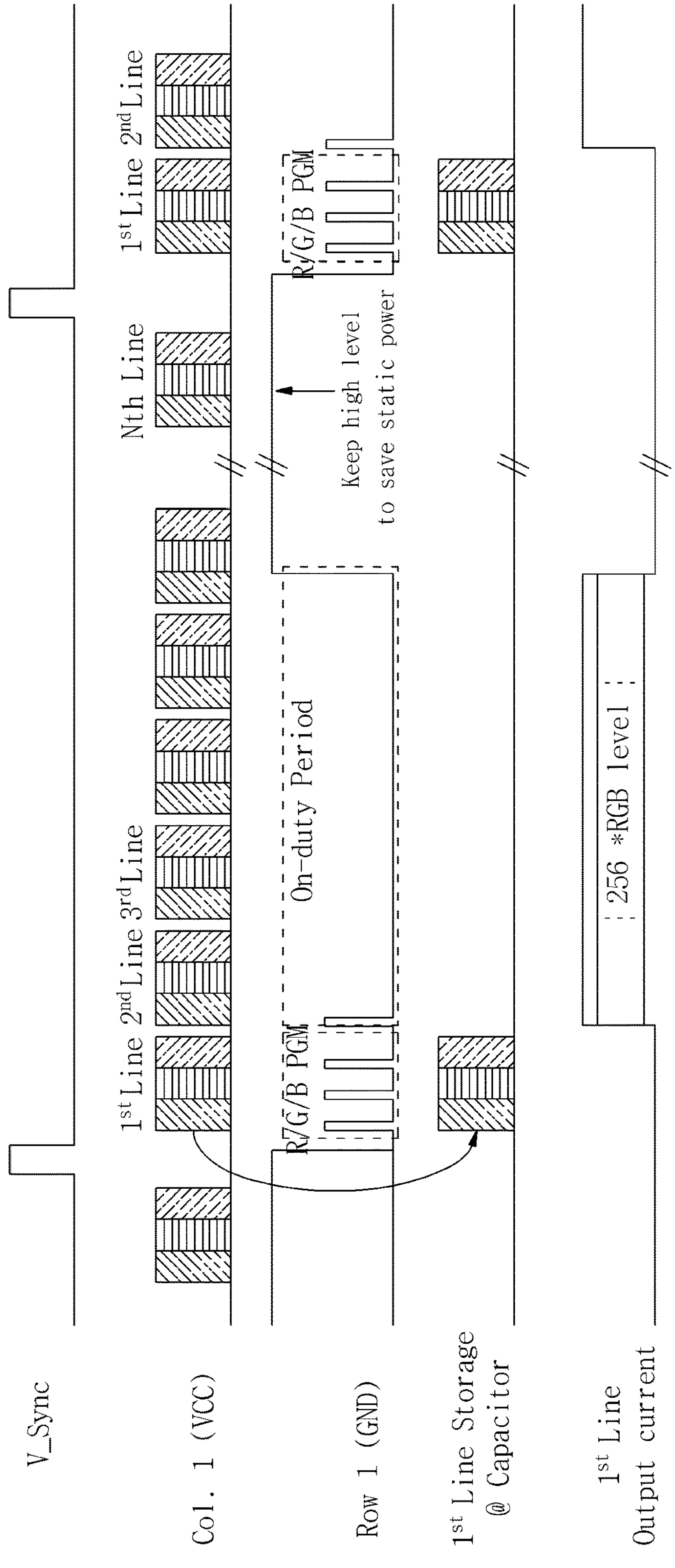
FIG. 8 shows a timing diagram of an analog pixel driving circuit of a display device that minimizes power consumption according to an embodiment of the present invention.

FIG. 8 shows a timing diagram of an analog driving pixel circuit of a display device that minimizes power consumption according to an embodiment of the present invention.

As shown in FIG. 7 and the corresponding specification mentioned above, the pixel circuit may receive the first voltage signal through the first column line Col. 1 and the second voltage signal through the first row line Row 1. According to an embodiment of the present invention, the first voltage signal may be a power supply voltage VCC superimposed with analog data, and the second voltage signal may be a ground voltage GND superimposed with a switch clock signal.

Analog data corresponding to the first line received through the first column line Col. 1 may be written into a capacitor included in the first line ($1^{st}$ line storage capacitor) according to the switch clock signal. Thereafter, the analog data may be emitted according to an emission clock included in the switch clock signal.

Meanwhile, according to an embodiment of the present invention, the voltage level of the second voltage signal may increase by more than a predetermined level during the non-emission period of the pixel 111 to which the first voltage signal and the second voltage signal are supplied. Accordingly, the first line output current for light emission corresponding to the analog data may not flow during the non-emission period.

In this case, the non-emission period may be a period excluding the data writing period and the light emission period in the frame period of the pixel. Referring to FIG. 8, a period of one cycle frame (based on V_Sync) excluding the data writing period PGM and the light emission period (on-duty period) may be a non-emission period.

Meanwhile, during the non-emission period of the pixel 111, the voltage level of the second voltage signal may increase to be greater than or equal to the first value and less than the second value. According to an exemplary embodiment, the first value may be the maximum voltage level among the second voltage signal levels for a period other than the non-light-emitting period of the pixel 111, and the second value may be the minimum voltage level among the first voltage signal levels for the entire frame period.

For example, as shown in FIG. 8, when the power supply voltage VCC is 18V and the voltage signal for analog data has a voltage width of 6V, the first voltage signal has a value between 18V and 24V during the entire frame period. In addition, when the ground voltage GND has 2V and the switch clock voltage signal has a voltage width of 6V, the second voltage signal has a value of 2V to 8V during the remaining period excluding the non-emission period. In this case, the first value may be 8V, the second value may be 18V, and the voltage level of the second voltage signal may be increased to 8V or more and less than 18V during the non-emission period.

According to an embodiment of the present invention, the second voltage signal may be increased such that a difference between the voltage level of the second voltage signal and the second value during the non-emission period of the pixel 111 is less than a predetermined value. In this case, the predetermined value may be a value corresponding to 50% of the difference between the first value and the second value, but this is only an example and may vary according to embodiments.

Specifically, when the first value is 8V, the second value is 18V, and the predetermined value is set to 50% of the difference between the first value and the second value, the predetermined value may be 5V. That is, the signal controller 121 may generate the second voltage signal so that the voltage level of the second voltage signal becomes any one of 13V or more and less than 18V during the non-emission period.

According to the above-described embodiment, the difference between the power voltage VCC and the ground voltage GND is reduced during the non-emission period, and the first line output current may not flow during the non-emission period. Accordingly, wasted current due to static current during the non-emission period can be minimized according to an aspect of the present invention.

Figure 9:
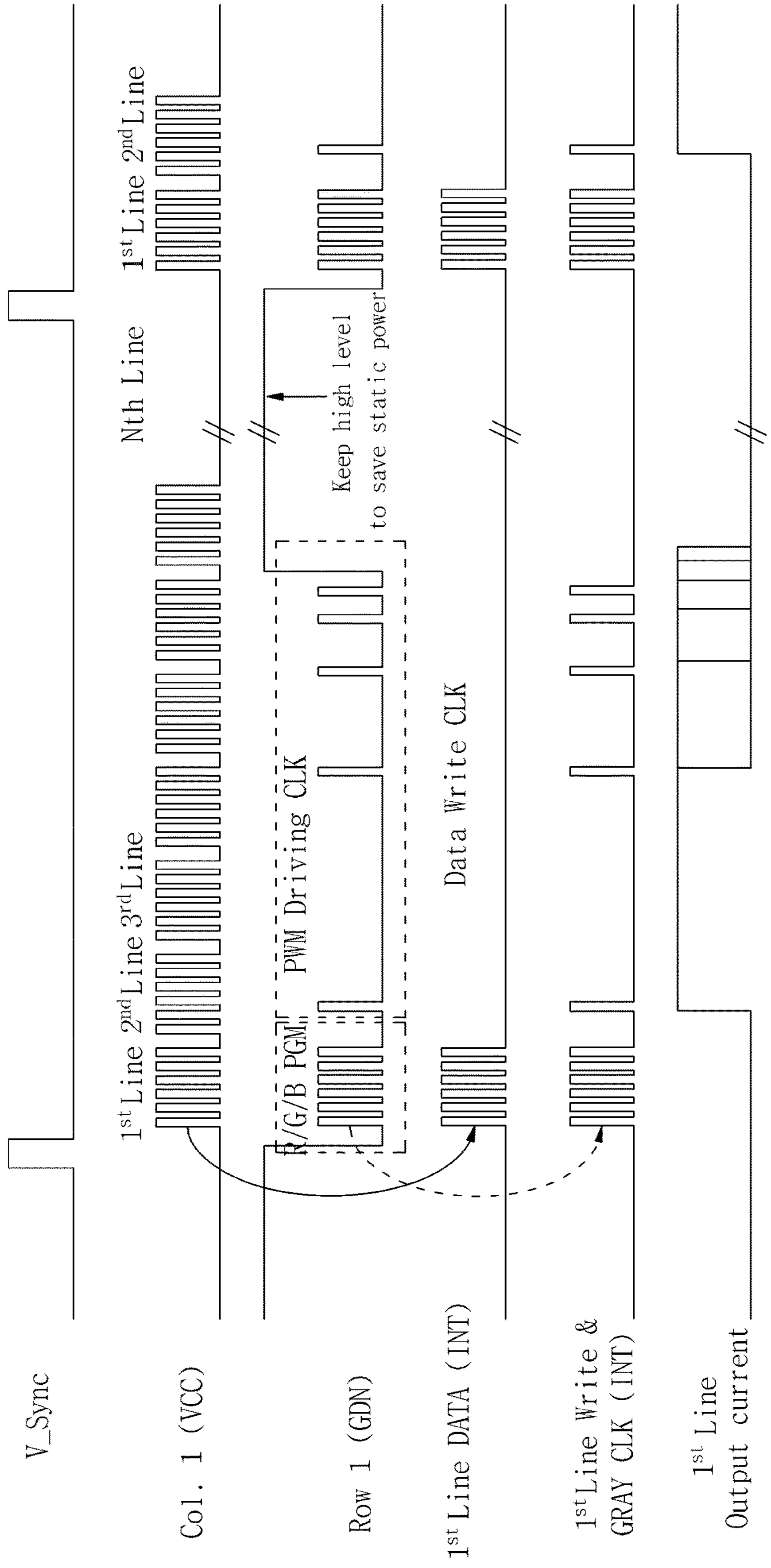
FIG. 9 shows a timing diagram of a digital driving pixel circuit of a display device that minimizes power consumption according to an embodiment of the present invention.

FIG. 9 shows a timing diagram of a digital driving pixel circuit of a display device that minimizes power consumption according to an embodiment of the present invention.

Referring to FIG. 9, the pixel circuit may receive a first voltage signal through the first column line Col. 1 and a second voltage signal through the first row line Row 1. According to an embodiment of the present invention, the first voltage signal may be a power voltage VCC on which the digital data generation signal is superposed, and the second voltage signal may be a ground voltage GND on which the clock generation signal is superposed.

The pixel circuit according to an embodiment of the present invention may generate data and a clock based on signals received through the column line CL and the row line RL, respectively.

Specifically, the pixel circuit may generate data and clocks according to predetermined rules based on a power voltage and a ground voltage in which the data generation signal and the clock generation signal are modulated.

The above rule is that the pixel circuit may detect a relative voltage change, i.e., the first voltage signal through the column line CL, that is, a relative voltage change of the power voltage VCC on which the signal is superimposed if a second voltage signal through the low line (RL) is constant, i.e., a ground voltage GND is constant.

Also, the rule may be that the pixel circuit detects a relative voltage change of the second voltage signal through the row line RL when the first voltage signal through the column line CL is constant. Also, the rule may be such that the pixel circuit detects a relative voltage change between the first voltage signal through the column line CL and the second voltage signal through the row line RL.

The pixel circuit may perform various operations, such as program operation (program time), emission operation (operation time), initial setting, data signal generation, and clock signal generation, according to a detected rule.

Referring to FIG. 9, the pixel circuit may generate first line data corresponding to the first line and a clock signal corresponding to the first line clock signal (1st Line Write & Gray CLK) according to a predetermined rule. The first line data may be written and emitted according to the clock signal (1st Line Write & Gray CLK).

Meanwhile, according to an embodiment of the present invention, the voltage level of the second voltage signal may increase by more than a predetermined level value during the non-emission period of the pixel 111 to which the first voltage signal and the second voltage signal are supplied.

In this case, the non-emission period may be a period excluding a data writing period and a light emission period in the frame period of the pixel. Referring to FIG. 9, a period of one cycle frame (based on V_Sync) excluding the data writing period PGM and the light emission period may be a non-emission period.

Meanwhile, during the non-emission period of the pixel 111, the voltage level of the second voltage signal may increase to be greater than or equal to the first value and less than the second value. According to an exemplary embodiment, the first value may be the maximum voltage level among the second voltage signal levels for the period other than the non-emission period of the pixel 111, the second value may be a minimum voltage level among the first voltage signal levels during the entire frame period.

According to an embodiment of the present invention, the second voltage signal may be increased such that a difference between the voltage level of the second voltage signal and the second value during the non-emission period of the pixel 111 is less than a predetermined value.

In this case, the predetermined value may be a value corresponding to 50% of the difference between the first value and the second value, but this is only an example and may vary according to embodiments.

According to the above-described embodiment, since the voltage level of the second voltage signal has a relatively small difference from the first voltage signal during the non-emission period, a wasted current due to a static current during the non-light-emitting period may be minimized.

According to the above-described embodiment, the difference between the power voltage VCC and the ground voltage GND is reduced during the non-emission period, and the first line output current may not flow during the non-emission period. Accordingly, wasted current due to static current during the non-emission period can be minimized according to the present invention.

Figure 10:
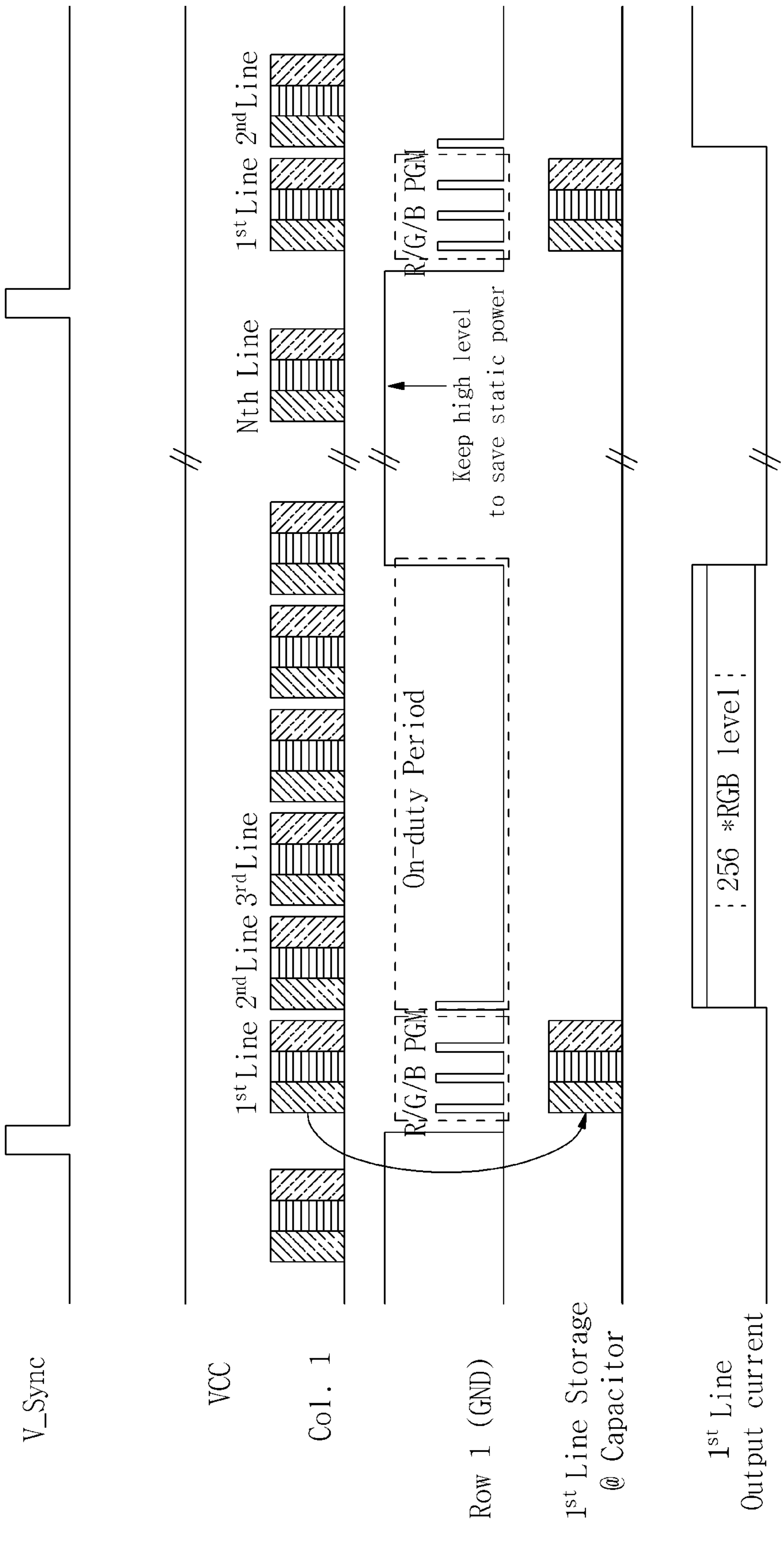
FIG. 10 shows a timing diagram of an analog pixel driving circuit of a display device that minimizes power consumption according to an embodiment of the present invention.

FIG. 10 shows a timing diagram of an analog driving pixel circuit of a display device that minimizes power consumption according to an embodiment of the present invention.

FIG. 7 to FIG. 9 illustrates an embodiment in which the power supply voltage VCC and the ground voltage GND are selectively overlapped among a column line and a row line, respectively, in order to minimize the contact point.

Meanwhile, according to another embodiment of the present invention, the display device 30 may transmit only one of the power voltages VCC and the ground voltage GND overlaps at least one of a column line and a row line. For example, In the case of an embodiment in which the number of contacts is reduced through the power application top plate, power voltage (VCC), ground voltage (GND), data, and clock can be delivered to the pixel circuit through three contacts.

Referring to FIG. 10, the pixel circuit may receive a first voltage signal through the first column line Col. 1, and may receive a second voltage signal through the first row line Row 1. In this case, the first voltage signal may be a signal including only analog data, and the second voltage signal may be a ground voltage GND on which a switch clock signal is superposed. Furthermore, in the present embodiment, the power voltage VCC may be transmitted to the pixel circuit through a separate contact point.

Also in the present embodiment, the voltage level of the second voltage signal may increase by more than a predetermined level value during the non-emission period of the pixel 111 to which the first voltage signal and the second voltage signal are supplied. Accordingly, the first line output current for light emission corresponding to the analog data may not flow during the non-emission period.

In this case, the non-emission period may be a period excluding the data writing period and the light emission period in the frame period of the pixel. Referring to FIG. 10, a period of one cycle frame (based on V_Sync) excluding the data writing period PGM and the light emission period (on-duty period) may be a non-emission period.

Meanwhile, during the non-emission period of the pixel 111, the voltage level of the second voltage signal may increase to be greater than or equal to the first value and less than the second value.

According to an exemplary embodiment, the first value may be the maximum voltage level among the second voltage signal levels during the period other than the non-emission period of the pixel 111, and the second value may be a minimum voltage level among the power voltages VCC during the entire frame period.

According to the above-described embodiment, the difference between the power voltage VCC and the ground voltage GND is reduced during the non-emission period, and the first line output current may not flow during the non-emission period. Accordingly, according to the present invention, wasted current due to static current during the non-emission period can be minimized.

As described above, as shown in FIG. 8 to FIG. 10, the display device 30 may increase the second voltage signal to a predetermined value or more during the non-emission period of the pixel 111 according to aspect of the present invention. At this time, the second voltage signal is only one example, and the display 30, when the first voltage signal overlaps with the ground voltage (GND) according to an embodiment, of course, the first voltage signal may rise above the predetermined value during the non-illumination period.

In this case, the second voltage signal is only an example, and according to an embodiment, when the first voltage signal overlaps with the ground voltage GND, of course, it is possible to increase the first voltage signal by more than a predetermined value during the non-emission period.

When one frame period (1 V_Sync reference period) ends, the display device 30 according to an embodiment of the present invention may decrease the voltage level of the second voltage signal to the voltage level of the second signal again. In this case, the second signal may be the ground voltage GND.

Meanwhile, the display device 30 according to an embodiment of the present invention may initialize the pixel circuit when the voltage level of the second voltage signal is smaller than the predetermined value Meanwhile, the display device 30 according to an embodiment of the present invention may initialize the pixel circuit when the voltage level of the second voltage signal is smaller than the predetermined value. Specifically, the pixel circuit according to an embodiment of the present invention may include a POR generator (not shown). In this case, the POR generator may have a circuit configuration for providing a predictable and standardized voltage. The POR generator may provide a reference current so that the light emitting device can always emit light under the same conditions.

The pixel circuit of the present invention may control the POR generator to initialize the pixel circuit when it is detected that the voltage level of the second voltage signal is changed from a voltage level greater than or equal to a predetermined value to a voltage level less than or equal to the predetermined value.

Figure 11:
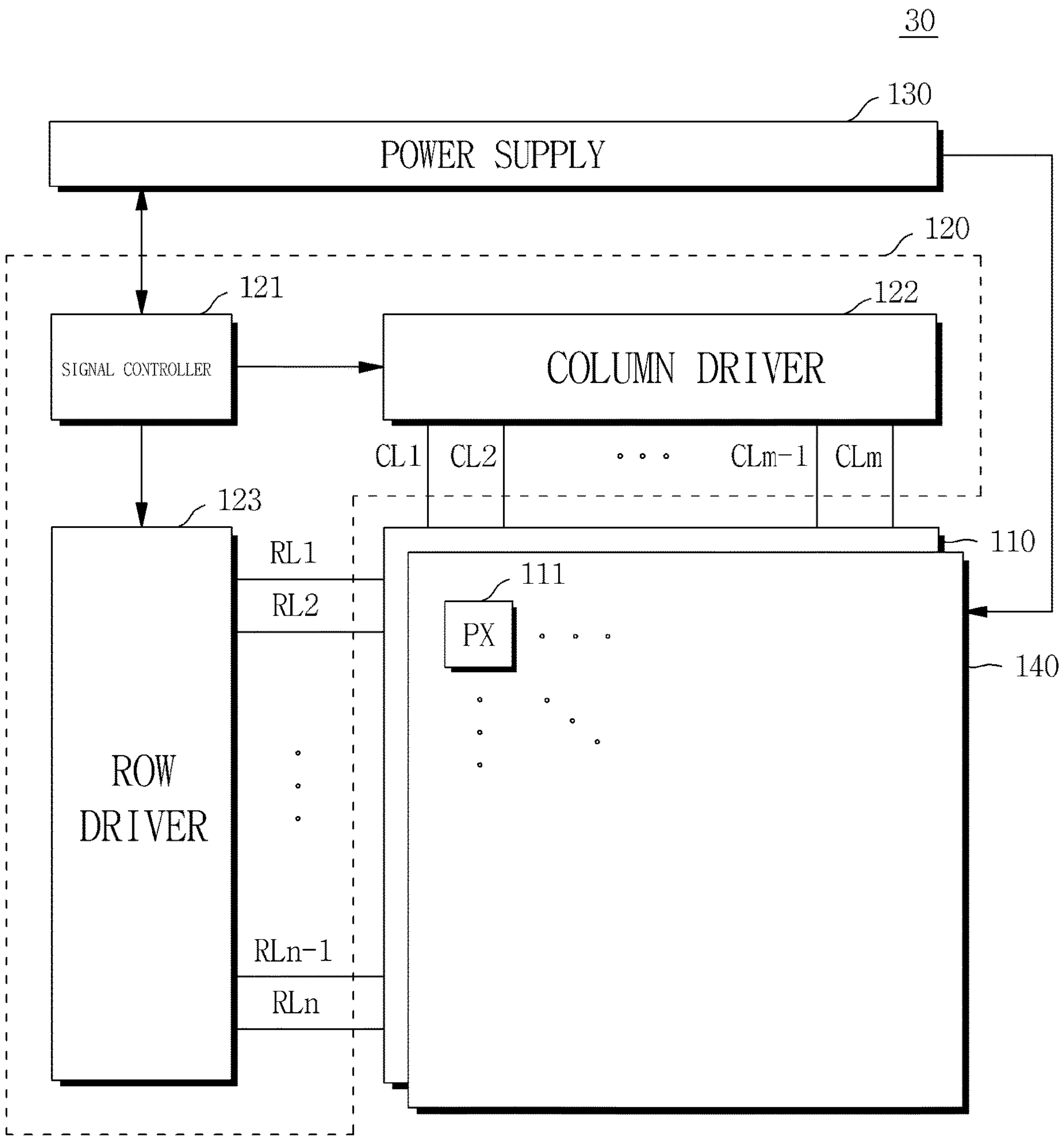
FIG. 11 is a schematic block diagram illustrating components of a display device according to an embodiment of the present invention.

FIG. 11 is a block diagram schematically illustrating components of a display device according to an embodiment of the present invention.

Referring to FIG. 11, the display device 30 may include a pixel unit 110 and a driver 120.

The pixel unit 110 may display an image using an m-bit digital image signal capable of displaying 1 to $2^m$ gray scales. The pixel unit 110 may include a plurality of pixels PX arranged in various patterns such as a predetermined pattern, for example, a matrix type or a zigzag type. The pixel PX may emit one color, for example, one color among red, blue, green, and white. The pixel PX may emit colors other than red, blue, green, and white.

The pixel PX may include a light emitting device. The light emitting device may be a self-luminous device. For example, the light emitting device may be a light emitting diode (LED). The light emitting device may be a light emitting diode (LED) having a micro to nano unit size. The light emitting device may emit light at a single peak wavelength or may emit light at a plurality of peak wavelengths.

The pixel PX may further include a pixel circuit connected to the light emitting device. The pixel circuit may include at least one thin film transistor and at least one capacitor. The pixel circuit may be implemented by a semiconductor stacked structure on a substrate.

The pixel PX may operate in units of frames. One frame may be composed of a plurality of subframes. Each subframe may include a data writing period and a light emission period. During the data writing period, digital data of a predetermined bit may be applied to and stored in the pixel PX. A predetermined bit of digital data stored in the light emission period is read out in synchronization with a clock signal, and the digital data is converted into a PWM signal so that the pixel PX can express a gray level. The light emission period of the subframe may be the sum of time allocated to each bit of digital data.

The driving unit 120 may drive and control the pixel unit 110. The driver 120 may include a signal controller 121, a column driver 122, and a row driver 123 according to an embodiment of the present invention.

The signal controller 121 may generate and control a signal to be transmitted to the pixel unit 110 through the column driver 122 and the row driver 123. The signal controller 121 may generate a first voltage signal and a second voltage signal, and transmit the first voltage signal and the second voltage signal to the column driver 122 and the row driver 123 according to an embodiment of the present invention The column driver 122 and the row driver 123 may transmit the first voltage signal and the second voltage signal to the pixel unit 110 through the column lines CL1 to CLm and the row lines RL1 to RLn. The pixel circuit included in the pixel 111 may generate data and clocks corresponding to the first voltage signal and the second voltage signal.

The power supply 130 is configured to provide a power voltage VCC and a ground voltage GND. Specifically, the power supply 130 may transmit a signal corresponding to a power voltage or a ground voltage to the signal controller 121 and an electrode 140.

The electrode 140 may be configured to transmit a power voltage or a ground voltage applied from the power supply 130 to the pixel. The electrode 140 according to an embodiment of the present invention may be a transparent electrode body using indium tin oxide (ITO), and may be an electronic component having a high transparency of 80% or more and a sheet resistance of 500 Ω/m2 or less and conductivity.

According to an embodiment of the present invention, the electrode 140 may transmit the power supply voltage and the ground voltage to the pixel circuit connected to the plurality of pixels PX arranged in the pixel unit 110 and the light emitting device LED corresponding to each pixel PX. In this case, the pixel circuit may include at least one thin film transistor and at least one capacitor, and may be implemented by a semiconductor stack structure on a substrate.

According to an embodiment of the present invention, a signal transmitted from the power supply 130 to the pixel circuit through the electrode 140 may be a third voltage signal. The first voltage signal may be a signal in which a VCC voltage is superimposed on a signal for generating data, and the second voltage signal may be a signal for generating a clock. In this case, the third voltage signal may be a signal corresponding to the ground voltage.

According to another embodiment of the present invention, the first voltage signal may be a signal for generating data, and the second voltage signal may be a signal in which a VCC voltage is superimposed on a signal for generating a clock. In this case, the third voltage signal may be a signal corresponding to the ground voltage.

However, this is only an example, and the first voltage signal may be a signal in which a ground voltage is superimposed on a signal for generating data, and the second voltage signal may be a signal for generating a clock. In this case, the third voltage signal may be a signal corresponding to the power supply voltage. According to another embodiment of the present invention, the first voltage signal may be a signal for generating data, and the second voltage signal may be a signal in which a ground voltage is superimposed on a signal for generating a clock. In this case, the third voltage signal may be a signal corresponding to the tangent voltage.

As described above, the pixel circuit of the present invention may receive the first signal to the third signal through at least three contact points, and may perform a corresponding operation.

Figure 12:
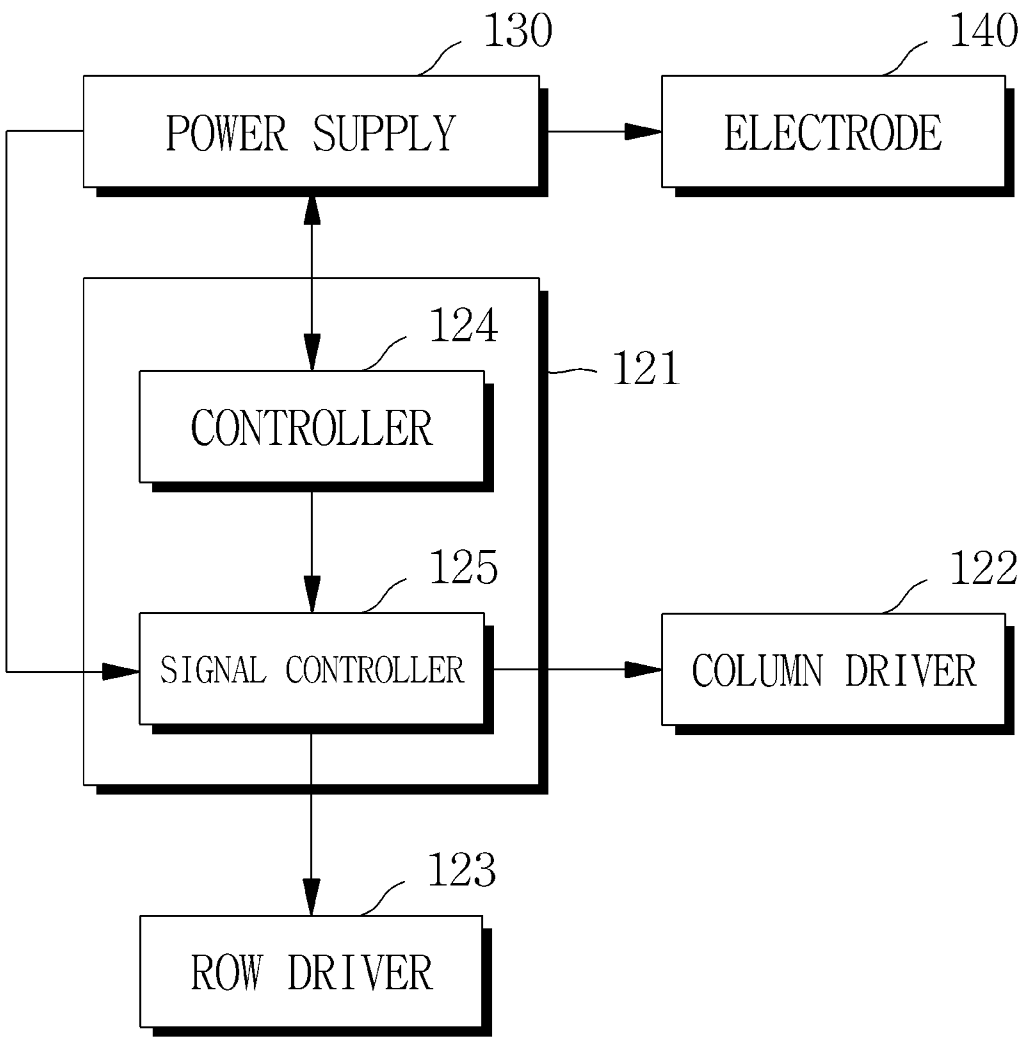
FIG. 12 is a block diagram for explaining the components of a signal controller according to an embodiment of the present invention.

FIG. 12 is a block diagram for explaining the components of a signal controller according to an embodiment of the present invention.

Referring to FIG. 12, the signal controller 121 of the present invention may include a controller 124 and a signal generator 125.

The power supply 130 of the present invention may output a power voltage VCC and a ground voltage GND. When the power supply 130 outputs the power voltage VCC to the electrode 140, the power supply 130 may output the ground voltage to the signal generator 125. Also, when the power supply 130 outputs the ground voltage to the electrode 140, the power supply 130 may output the power voltage to the signal generator 125.

The controller 124 may control the signal generator 125 to generate a first voltage signal and a second voltage signal. According to an embodiment of the present invention, the signal generator 125 may receive a power supply voltage or a ground voltage from the power supply 130 and generate a first voltage signal and a second voltage signal. Specifically, the first voltage signal may be a first signal superimposed on a power voltage or a ground voltage, and the second voltage signal may be a second signal. According to another embodiment, the first voltage signal may be a first signal, and the second voltage signal may be a power voltage or a ground voltage and a second signal superimposed thereon.

In this case, the first signal may be a signal for generating a clock, and the second signal may be a signal for generating data. However, this is only an example, and the first signal may be a signal for generating data, and the second signal may be a signal for generating a clock signal.

According to an embodiment of the present invention, the first voltage signal and the second voltage signal may be respectively output to the row driver 123 and the column driver 122. For example, the first signal may be an analog data signal, and the second signal may be a switch clock signal. In this case, the second signal may be a switch clock corresponding to the data writing period and the light emission period, and the pixel circuit may perform an operation corresponding thereto.

Figure 13:
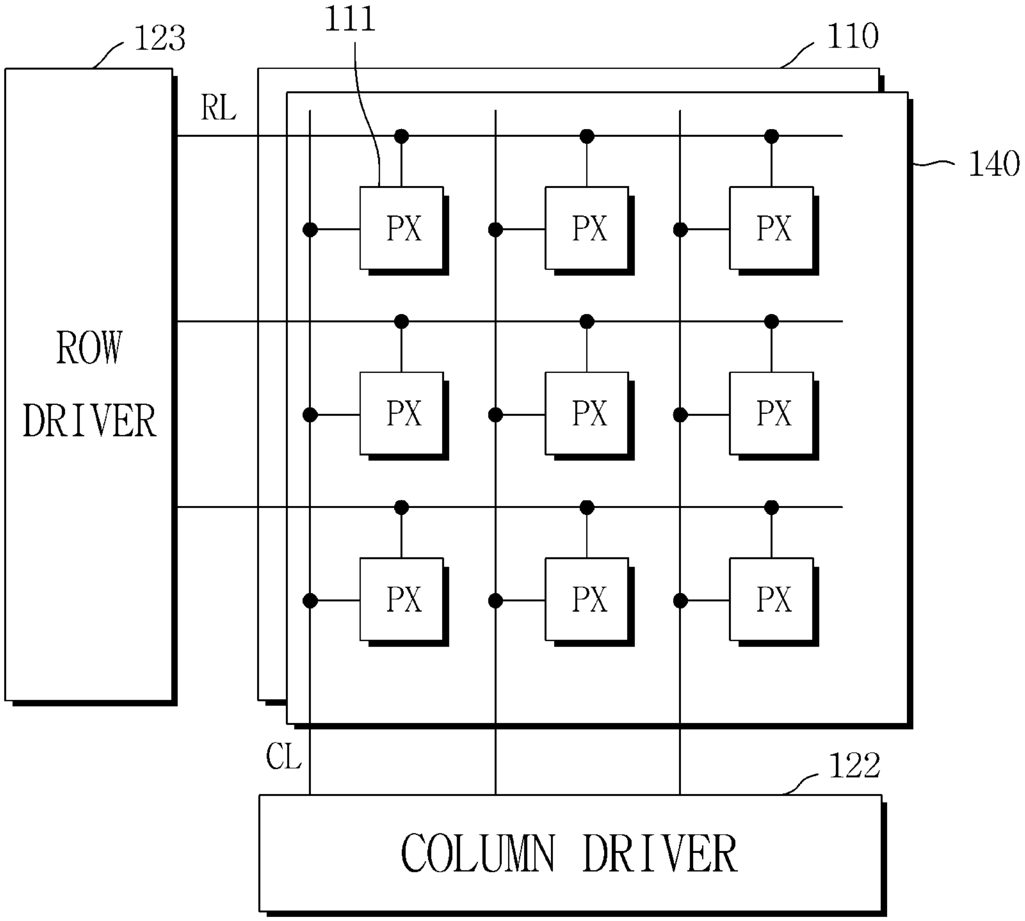
FIG. 13 illustrates a display device having a reduced number of contacts connected to a pixel circuit according to an embodiment of the present invention.

FIG. 13 illustrates a display device having a reduced number of contacts connected to a pixel circuit according to an embodiment of the present invention.

Referring to FIG. 13, the pixel 111 of the pixel unit 110 of the present invention is connected to a contact point connected to the row line RL connected to the row driver 123 and a column line CL connected to the column driver 122. It may contain contact points.

The pixel 111 of the pixel unit 110 of the present invention may include a contact connected to the row line RL connected to the row driver 123 and a contact connected to the column line CL connected to the column driver 122.

The column driver 122 may transmit a first voltage signal to the pixel 111, and the row driver 123 may transmit a second voltage signal to the pixel 111. In this case, the electrode 140 may transmit the third voltage signal to the pixel 111.

For example, the column driver 122 may transmit a signal in which the data generation signal is superimposed on the power voltage VCC to the pixel 111, and the row driver 123 may transmit the clock generation signal to the pixel 111. and the electrode 140 may transmit the ground voltage GND to the pixel 111.

In another embodiment, the column driver 122 may transmit a data generation signal to the pixel 111, and the row driver 123 may transmit a signal obtained by superimposing a power voltage VCC with a clock generation signal to the pixel 111. The electrode 140 may transmit the ground voltage GND to the pixel 111.

In another embodiment, the column driver 122 may transmit a signal in which the data generation signal is superimposed on the ground voltage GND to the pixel 111, and the row driver 123 may transmit the clock generation signal to the pixel 111. The electrode 140 may transmit the power voltage VCC to the pixel 111.

In another embodiment, the column driver 122 may transmit a data generation signal to the pixel 111. The row driver 123 may transmit a signal in which a clock generation signal is superimposed on a ground voltage GND to the pixel 111. The electrode 140 may transmit the power voltage VCC to the pixel 111.

In another embodiment, the column driver 122 may transmit a data generation signal to the pixel 111, the row driver 123 may transmit a signal in which a clock generation signal is superimposed on a ground voltage GND to the pixel 111, and the electrode 140 may transmit the power voltage VCC to the pixel 111.

That is, the display device 30 according to the present invention may transmit the data signal or the clock signal by overlapping the power supply voltage or the ground voltage, so that a separate line for the power supply voltage or the ground voltage can be reduced. It can be implemented through contact points.

Figure 14:
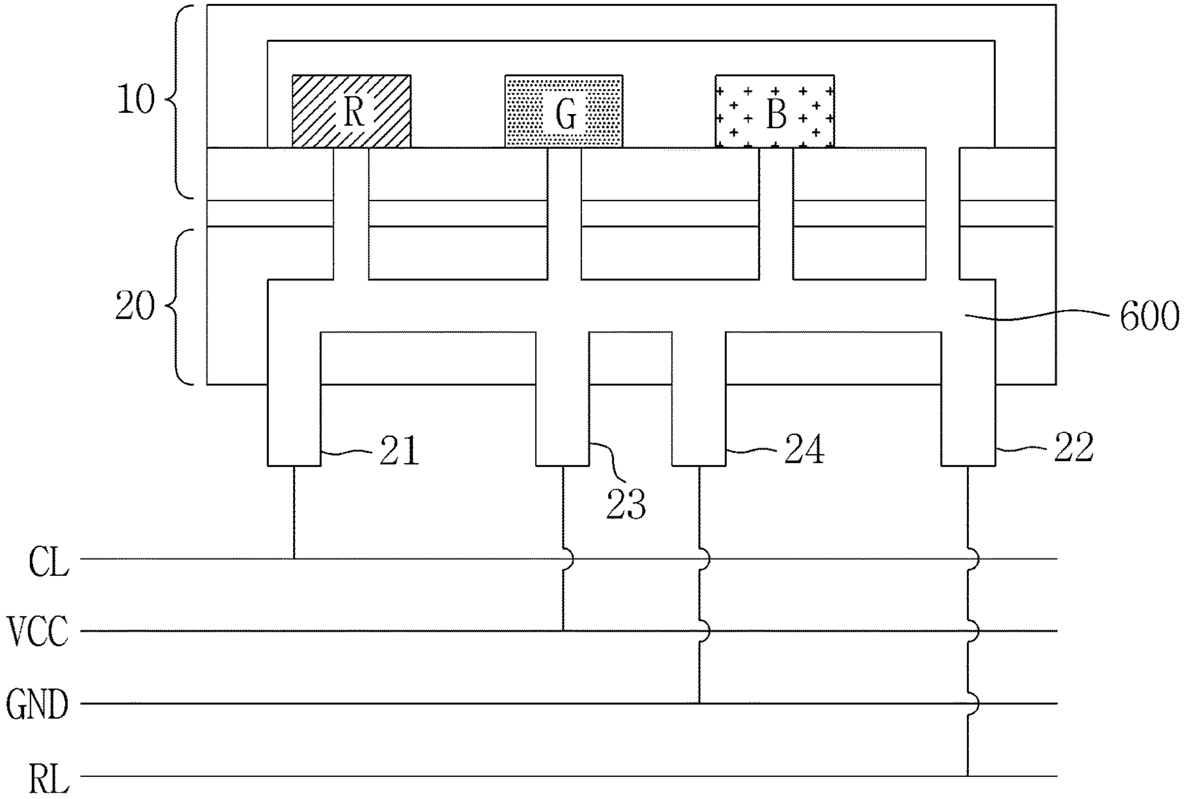
FIG. 14 is a pixel cross-sectional view illustrating the structure of a pixel included in a conventional display device.

FIG. 14 is a pixel cross-sectional view illustrating the structure of a pixel included in a conventional display device.

Referring to FIG. 14, a plurality of light emitting diodes R, G, and B may be arranged in the light emitting device array 10, and a pixel circuit corresponding to each of the light emitting diodes on the light emitting device array 10 may be arranged on the driving circuit board 20.

A first voltage signal may be supplied to the first contact 21 of the pixel circuit through a column line CL, and a second voltage signal may be supplied to the second contact 22 of the pixel circuit through a row line RL.

Meanwhile, the pixel circuit corresponding to each light emitting diode may be supplied with power through a common anode and a common cathode. The power voltage VCC is supplied to the pixel circuit through the first power contact 23, and the ground voltage GND is supplied through the second power contact 24. That is, the conventional pixel circuit requires at least four contacts for signal transmission.

Figure 15:
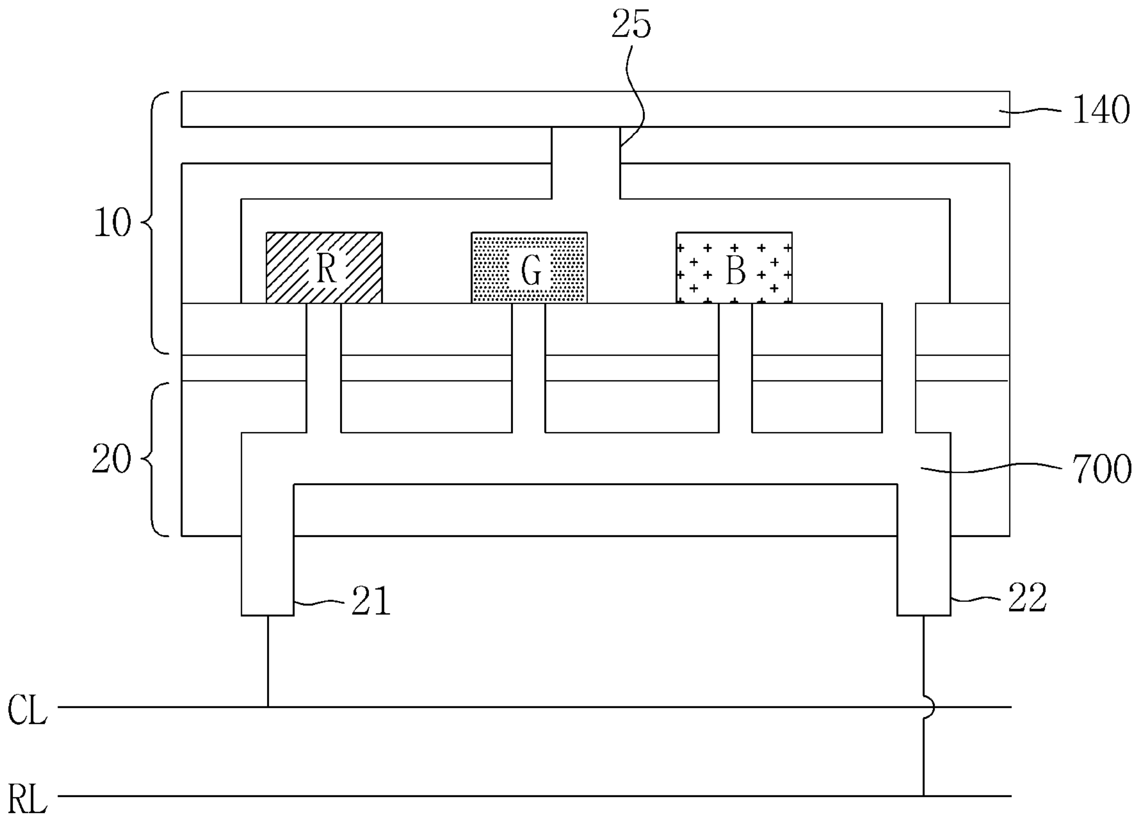
FIG. 15 is a cross-sectional view of a pixel for illustrating a pixel structure according to an embodiment of the present invention.

FIG. 15 is a cross-sectional view of a pixel for illustrating a pixel structure according to an embodiment of the present invention.

Referring to FIG. 15, the display device 30 of the present invention may include an electrode 140. In this case, the electrode 140 may be implemented to have a transparency of 80% or more, and may output any one of a power voltage and a ground voltage to each pixel circuit.

The electrode 140 of the present invention may be disposed to be bonded to the pixel circuit.

Specifically, the electrode 140 may be disposed on a specific direction surface of the light emitting device array 10 or the pixel unit 110 to be respectively bonded to each pixel circuit.

In this case, the specific direction surface may be a surface opposite to the direction of the driving circuit board 20 with respect to the light emitting device array 10. For example, the direction of the electrode 140 from the light emitting device array 10 may be a first direction, and the direction of the driving circuit board 20 from the light emitting device array 10 may be a second direction.

The electrode 140 may output a power signal transmitted from a power supply 130 to the pixel circuit through a third contact 25, and the pixel circuit may drive a common anode or a common cathode method based on the output power signal of the present invention.

Specifically, the power supply 130 according to an embodiment of the present invention may transmit a power voltage or a ground voltage to the electrode 140, and the electrode 140 may output the applied voltage to the pixel circuit. In this case, the power supply 130 may apply a voltage to the column driver 122 or the row driver 123 other than the voltage applied to the electrode 140.

For example, when the power supply 130 applies the power voltage VCC to the electrode 140, the power supply 130 may apply the ground voltage GND to the column driver 122. The column driver 122 may output a voltage signal in which the ground voltage GND and the data signal are superimposed to the pixel circuit. However, this is only an example, and when the power supply 130 applies the ground voltage GND to the electrode 140, the driving unit 120 is powered through one of the column drivers 122 or the row driver 123. A signal in which the voltage VCC is superimposed may be output to the pixel circuit.

That is, according to the present invention, any one of the power signals (power voltage and ground voltage) is provided to the pixel circuit by overlapping any one of the column line CL and the row line RL, there is an effect that the number of contact points of the pixel circuit can be reduced.

Figure 16:
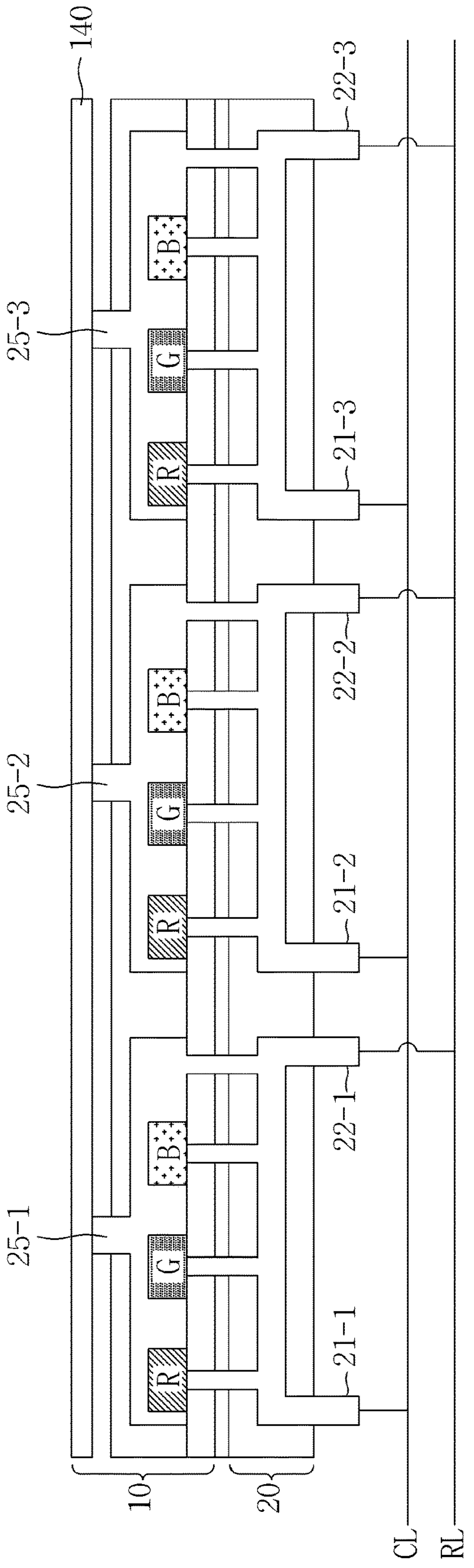
FIG. 16 is a cross-sectional view for explaining a structure of a display device according to an embodiment of the present invention.

FIG. 16 is a cross-sectional view for explaining a structure of a display device according to an embodiment of the present invention.

Referring to FIG. 16, the electrode 140 (or the power upper plate) of the present invention provides a power signal (power voltage or ground voltage) through the contacts 25-1, 25-2, and 25-3 between the respective pixel circuits.

Each pixel circuit has a first contact point 21-1, 22-1, 23-1, a second contact point 22-1, 22-2, 22-3, and a third contact point 25-1, 25-2, 25-3) can receive signals such as power signals and data signals only with three contacts.

FIG. 16 shows only three pixel circuits, of course, a power signal through the electrode 140 may be supplied to each pixel circuit included in an arbitrary number of pixels.

As described above, in the present invention, any one of the power signals (power voltage and ground voltage) is provided through the electrode 140 and the other power signal is superimposed on any one of the column line CL and the row line RL. Thus, by providing the pixel circuit, there is an effect that the number of contact points of the pixel circuit can be reduced.

In addition, according to the present invention, since a separate line is not required for the contact point between the electrode 140 and the pixel circuit, the complexity of the pixel circuit can be solved, and stable power supply is possible.

Since the transparent electrode body 140 (or the power top plate) is covered with the top plate of the display unit 100, there is an effect that the display unit 100 can be protected without impairing the display effect through the light emitting diode.

Figure 17A:
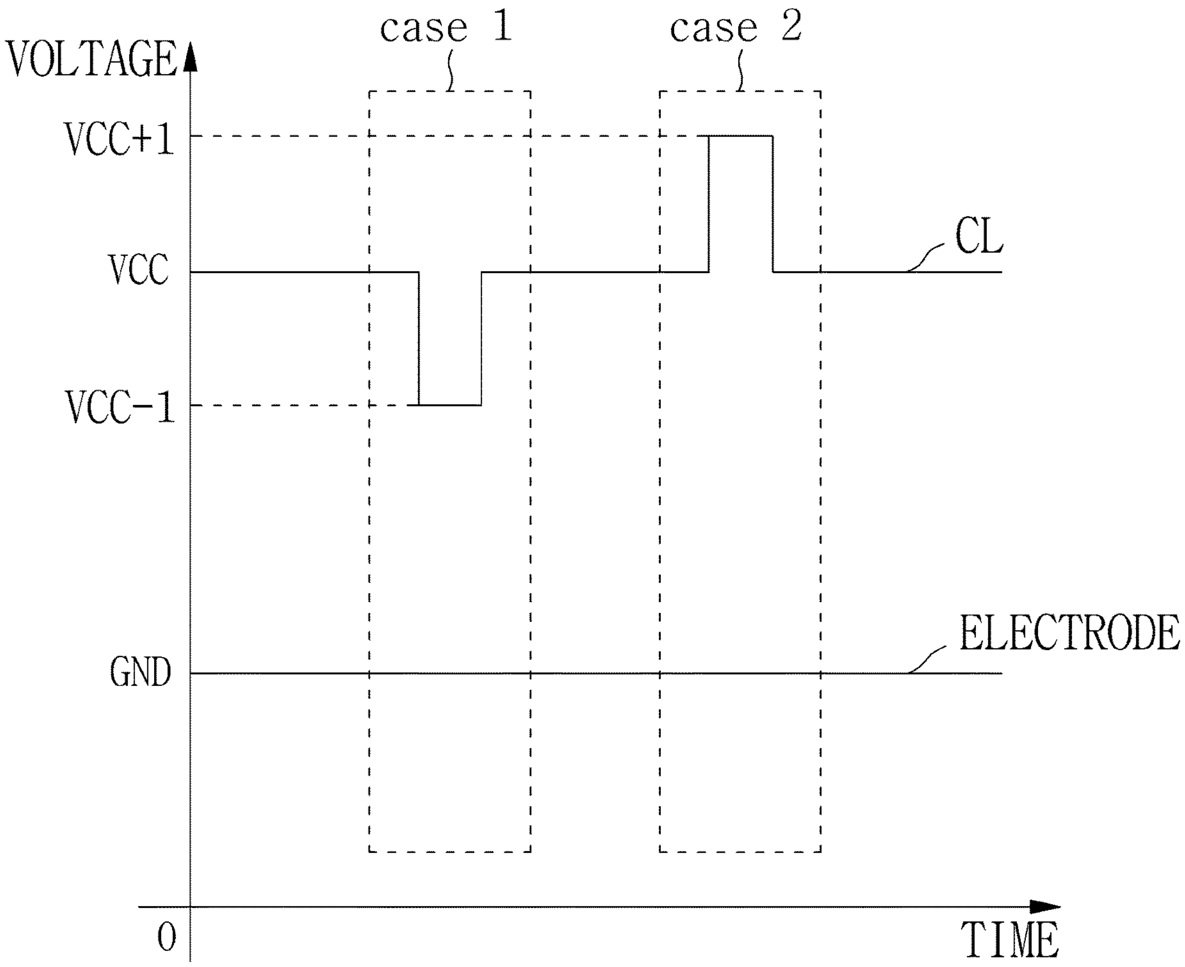
FIG. 17A to FIG. 17B is a diagram for explaining a predetermined rule for the signal generator to generate data and clock signals according to an embodiment of the present invention.
Figure 17B:
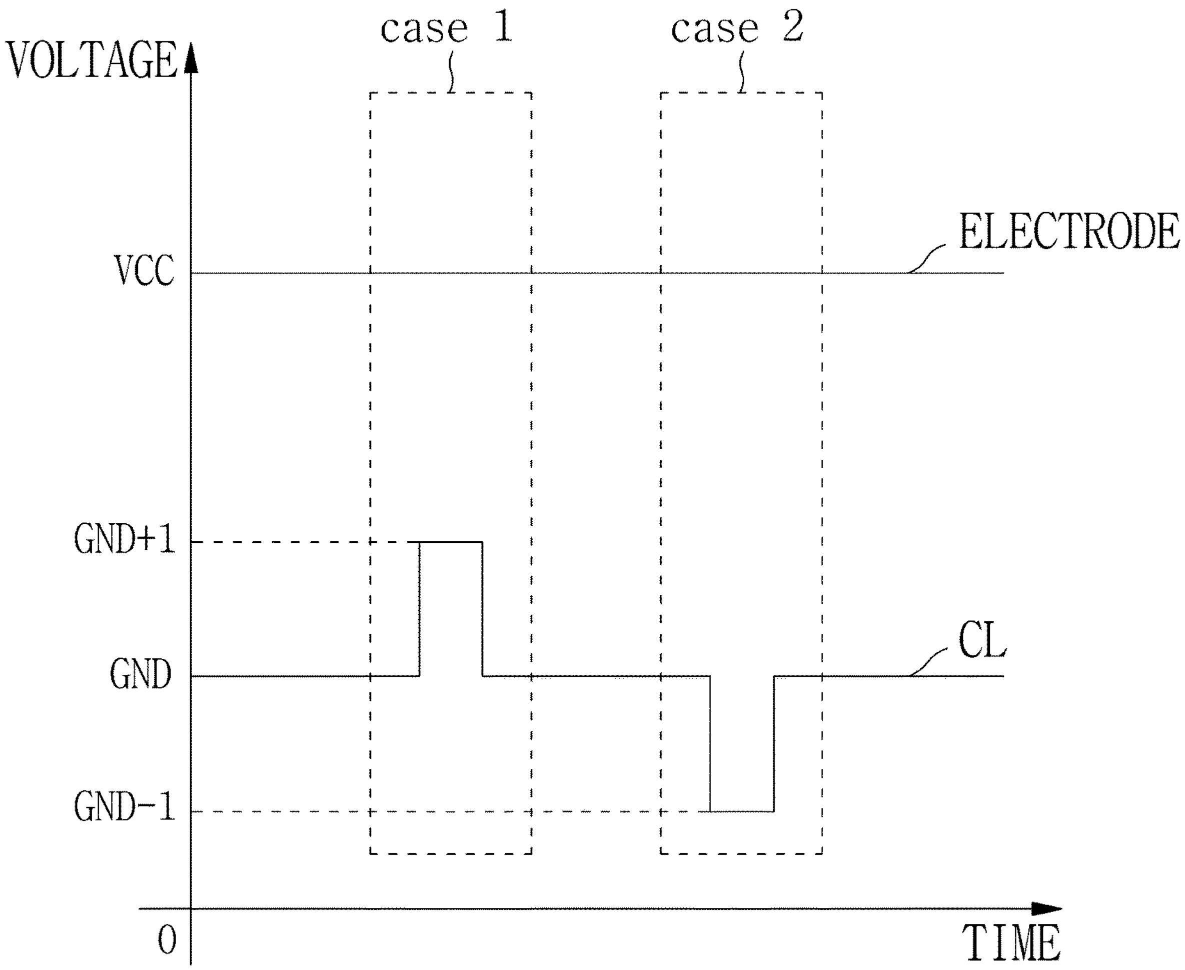

FIG. 17*a* to FIG. 17*b* is a diagram for explaining predetermined rules for generating data and clock signals by the signal generator according to an embodiment of the present invention.

As shown in FIG. 17*a*, the column line CL outputs a first voltage signal in which the power voltage VCC and the first signal are superimposed, and the electrode 140 outputs the ground voltage GND. Although not shown in the drawing, the row line RL may transmit the second signal as the second voltage signal. In this case, the first signal may be a signal for generating data, and the second signal may be a signal for generating a clock according to an aspect of the present invention.

Referring to FIG. 17*a*, the pixel circuit may detect a relative voltage change of the first voltage signal through the column line CL, that is, the power supply voltage VCC on which the signal is superimposed when the ground voltage GND output through the electrode 140 is constant.

When the ground voltage (GND) through the electrode 140 is constant, the pixel circuit in this embodiment may recognize a case as the first case (CASE 1) where the level of the first voltage signal through the column line (CL) drops by the set level (shown in this example VCC−1).

In addition, when the ground voltage (GND) through the electrode 140 is constant, the pixel circuit may recognize a case as a second case (CASE 2) when the first voltage signal level through the column line (CL) rises by the set level (shown in this example as VCC+1).

The pixel circuit may perform various operations, such as program time, emission time, initial setting, data signal generation, and clock signal generation, depending on the case. For example, the pixel circuit may be configured to generate data when the first case is recognized, and to generate a clock when the second case is recognized.

Referring to FIG. 17*b*, the pixel circuit may detect a relative voltage change of the first voltage signal through the column line CL when the power voltage VCC through the electrode 140 is constant. In particular, the column line CL according to FIG. 17*b* illustrates an embodiment in which the ground voltage GND on which the signals are superposed is transmitted as the first voltage signal according to an embodiment of the present invention.

When the power voltage VCC through the electrode 140 is constant, the pixel circuit may recognize a case as a third case (CASE 3) when the first voltage signal through the column line (CL) decreases by the predetermined level (shown in this example as GND-1).

In addition, when the power voltage VCC through the electrode 140 is constant, the pixel circuit may recognize a case a fourth case (CASE 4) where the first voltage signal through the column line (CL) rises by the set level (shown in this example as GND+1).

Depending on the case, the pixel circuit can perform a variety of actions, including programming time, emission time, initial setting, data signal generation, and clock signal generation. For example, the data clock generation unit 113 may be set to perform data signal generation when the third case is recognized, and to perform clock signal generation when the fourth case is recognized.

As shown in FIG. 17*a* and FIG. 17*b*, an embodiment in which a signal in which the power voltage VCC or the ground voltage GND is superimposed is output through the column line CL is illustrated. It is also possible a signal in which the power voltage VCC or the ground voltage GND is superimposed may be output through the row line RL.

By recognizing the predetermined cases, the pixel circuit may operate the same operation as in the case of more than 4 contacts can be performed, even if any one of the power voltages and the ground voltage is input while being superimposed on the signal corresponding to the data or clock signal according to aspect of the present invention.

Figure 18A:
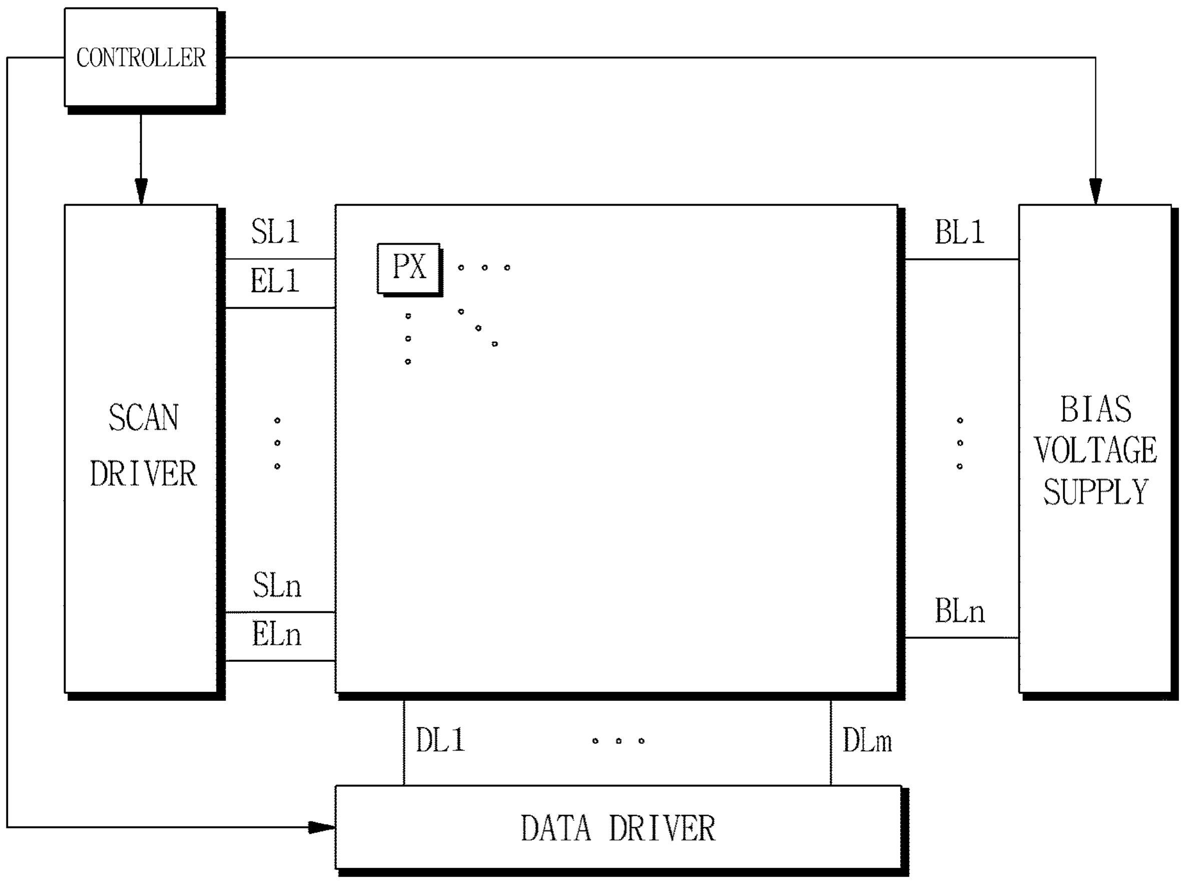
FIG. 18B and FIG. 18*b* shows a conventional display device and a pixel circuit structure.
Figure 18B:
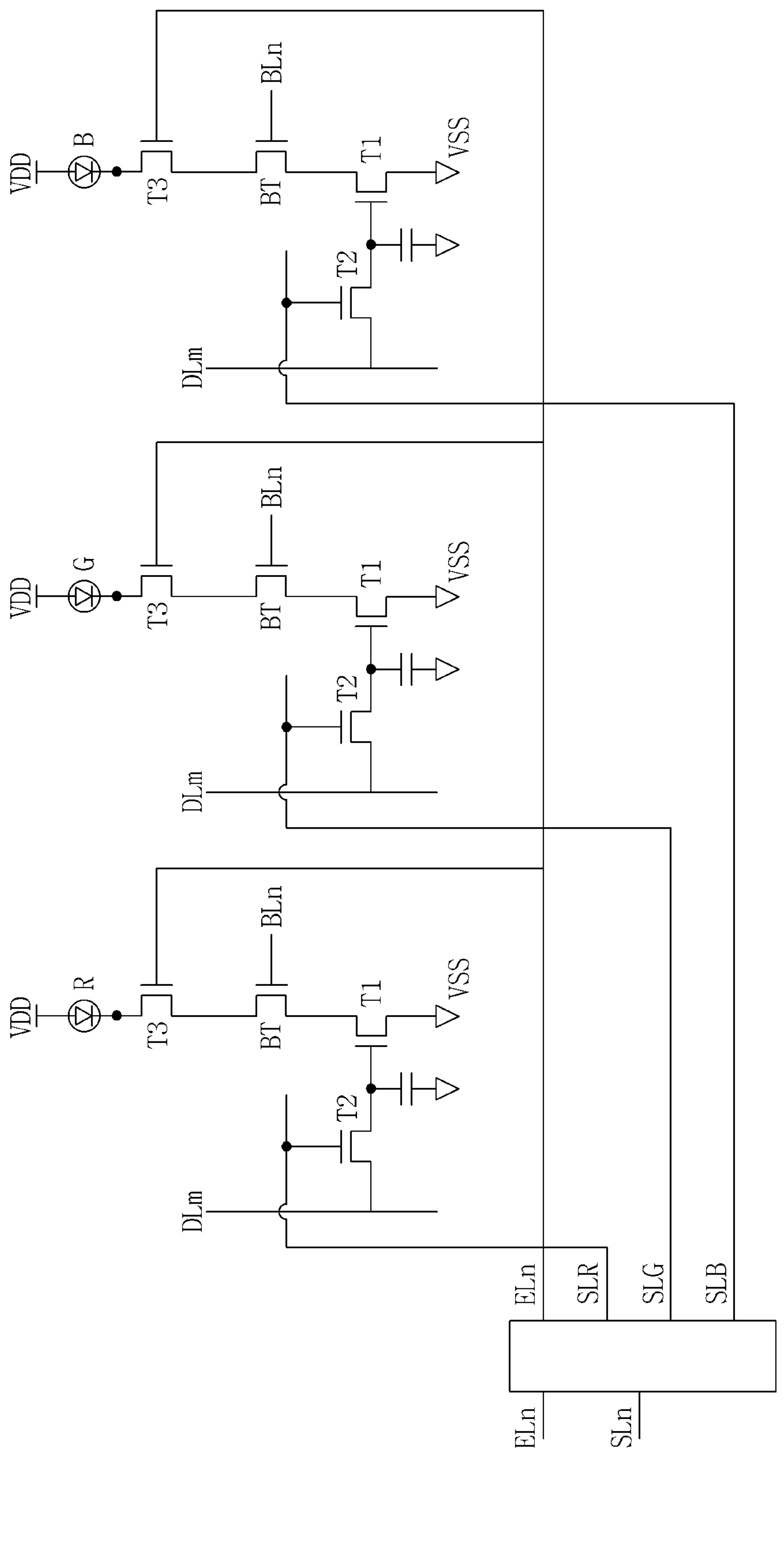

FIG. 18*a* and FIG. 18*b* shows a conventional display device and a pixel circuit structure.

In particular, FIG. 18*a* is a diagram schematically showing a conventional display device.

Referring to FIG. 18*a*, the display device may include a display unit and a driver. The driver may include a controller, a scan driver, a data driver, and a bias voltage supply.

The display unit may be disposed in a display area displaying an image. Scan lines SL1-SLn applying a scan signal to the pixels PX and data lines DL1-DLm applying a data signal to the pixels PX may be disposed on the display device. Each of the scan lines SL1-SLn is connected to the pixels PX arranged in the same row, and each of the data lines DL1 to DLm is connected to the pixels PX arranged in the same column.

Light emission control lines EL1-ELn for applying light emission control signals to the pixels PX may be further disposed in the display unit. Each of the emission control lines EL1 to ELn may be connected to the pixels PX arranged in the same row and spaced apart from the scan lines SL1 to SLn.

Under the control of the controller, the scan driver may sequentially apply a scan signal to the scan lines SL1-SLn, and the data driver may apply a data signal to each pixel PX. The pixels PX emit light with a brightness corresponding to a voltage level or a current level of a data signal received through the data lines DL1 to DLm in response to a scan signal received through the scan lines SL1 to SLn.

As described above, the conventional display device is shown in FIG. 18*a*, the scan line and the light emission control line are separately spaced apart from each other to each pixel PX, and the scan signal and the light emission control signal are supplied.

FIG. 18*b* shows a circuit structure for supplying a signal to a pixel circuit included in a conventional display device.

The pixel of FIG. 18*b* is shown as an example of the pixel arranged in the nth row and the mth column. The pixel PX is one of a plurality of pixels included in the n-th row, and is connected to the scan line SLn corresponding to the n-th row and the data line DLm corresponding to the m-th column.

The pixel PX may be connected to a scan line SLn that transmits a scan signal, a data line DLm that crosses the scan line SLn and transmits a data signal, and a power line that transmits the first power voltage VDD.

As shown in FIG. 18*b*, a pixel may include a sub-pixel circuit corresponding to each sub-pixel (R, G, B). Each sub-pixel circuit may contain a memory and requires a signal to program the memory. The scan line SLn connected to the pixel may be divided into three signal lines (SLR, SLG, and SLB in this figure) to provide a scan signal to each of the sub-pixel circuits.

That is, each pixel of the conventional display device requires at least four parallel signals as three signal lines (SLR, SLG, SLB) and a common emission control line (ELn) for programming each sub-pixel. As described above, since each pixel circuit requires a plurality of contacts, the number of routings required for parallel processing inevitably increases, and the interface becomes complicated.

In order to solve the above-described problem, in the embodiment of the present invention, a signal supplied to the pixel circuit may be serially processed.

Figure 19:
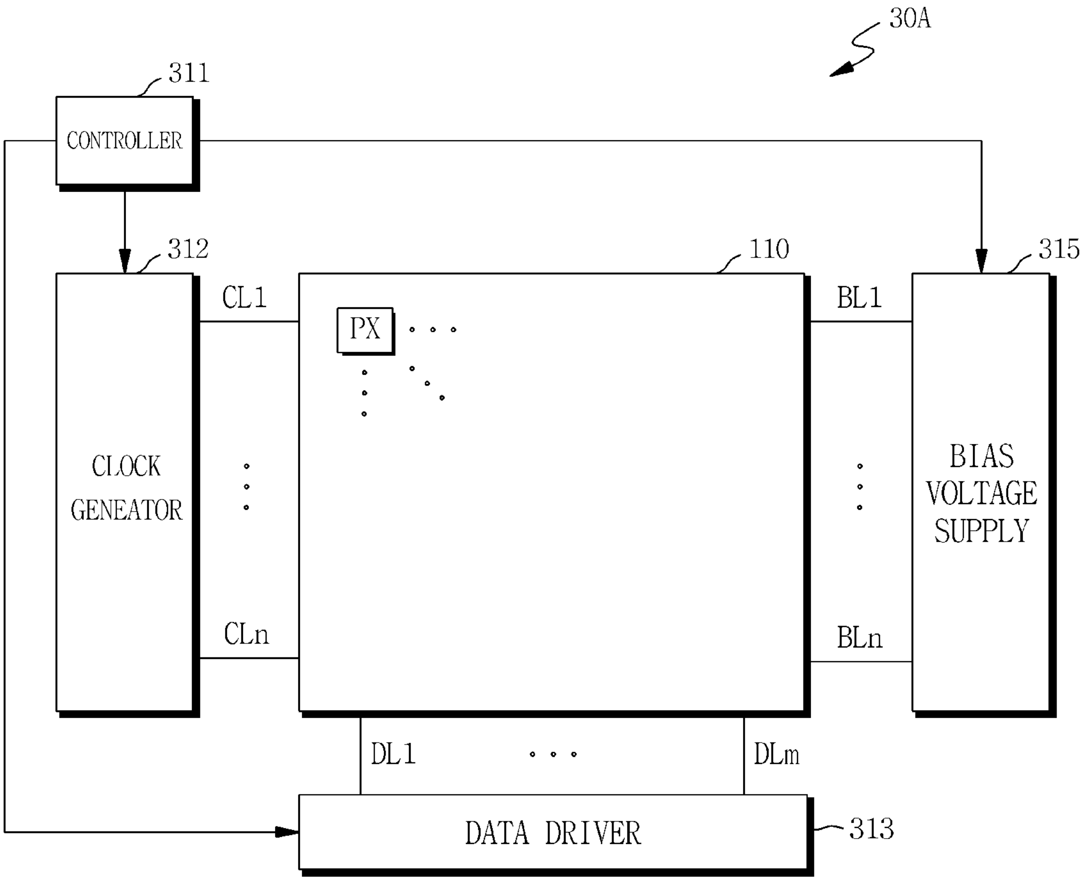
FIG. 19 is a schematic diagram illustrating a display device according to an embodiment of the present invention.

FIG. 19 is a diagram schematically showing a display device according to an embodiment of the present invention.

Referring to FIG. 19, the display device 30 of the present invention may include a pixel unit 110 and a driver.

The pixel unit 110 may be disposed in a display area for displaying an image. The pixel unit 110 may include a plurality of pixels PX arranged in various patterns such as a predetermined pattern, for example, a matrix type or a zigzag type. The pixel PX emits one color, for example, one color among red, blue, green, and white. The pixel PX may emit colors other than red, blue, green, and white.

The pixel PX may include a light emitting device. The light emitting device may be a self-luminous device. For example, the light emitting device may be a light emitting diode (LED). The light emitting device may emit light at a single peak wavelength or may emit light at a plurality of peak wavelengths.

The pixel PX may further include a pixel circuit connected to the light emitting device. The pixel circuit may include at least one thin film transistor and at least one capacitor. The pixel circuit may be implemented by a semiconductor stacked structure on a substrate.

Clock lines CL1-CLn applying a clock signal to the pixels PX and data lines DL1-DLm applying a data signal to the pixels PX may be disposed in the pixel unit 110. Each of the clock lines CL1-CLn is connected to the pixels PX arranged in the same row, and each of the data lines DL1 to DLm is connected to the pixels PX arranged in the same column.

Light emission control lines EL1-ELn for applying light emission control signals to the pixels PX may be further disposed in the pixel unit 110. Each of the emission control lines EL1 to ELn may be connected to the pixels PX arranged in the same row and spaced apart from the clock lines CL1 to CLn.

Bias lines BL1-BLn for applying a bias voltage to the pixels PX may be further disposed in the pixel unit 110. Each of the bias lines BL1 to BLn may be connected to the pixels PX arranged in the same row and spaced apart from the clock lines CL1 to CLn.

The driving unit is provided in the non-display area around the pixel unit 110, and may drive and control the pixel unit 110. The driver 120 may include a controller 311, a clock generator 312, a data driver 313, and a bias voltage supply 315.

Under the control of the controller 311, the clock generator 312 sequentially applies a clock signal to the clock lines CL1-CLn, the data driver 313 may apply a data signal to each pixel PX. The pixels PX emit light with a brightness corresponding to the voltage level or current level of the data signal received through the data lines DL1 to DLm based on the clock signal received through the clock lines CL1 to CLn.

In particular, each sub-pixel included in the pixel PX may store a data signal based on the clock signal, and in response, emits light with a brightness corresponding to the voltage level or current level of the data signal. In this case, the clock signal may be serially processed in the pixel circuit and sequentially supplied to each sub-pixel. For this, FIG. 4 will be described in more detail.

The bias voltage supply 315 may supply a bias voltage for turning on a bias transistor controlling a drain voltage of a driving transistor of each pixel PX to the bias lines BL1-BLn. The bias lines BL1-BLn may be connected to a gate terminal of the bias transistor.

According to an embodiment of the present invention, the controller 311 may control a power supply (not shown) to generate a first voltage signal including a data signal and a second voltage signal including a clock signal. The first voltage signal of the present invention may be a power voltage superimposed with a first signal, and the second voltage signal may be a ground voltage superposed with a second signal.

The first voltage signal may be a signal for generating data superimposed on a power supply voltage, and the second voltage signal may be a signal for generating a clock superimposed on a ground voltage. However, this is only an example, and the first voltage signal may be a signal for generating data superimposed on a ground voltage, and the second voltage signal may be a signal for generating a clock superimposed on a power supply voltage according to an embodiment of the present invention.

Specifically, the controller 311 may control a power supply (not shown) to output the power voltage VCC and the ground voltage GND. The controller 311 may superimpose a first signal (e.g., a signal for generating a clock) and a second signal (e.g., a signal for generating data) on the power supply voltage VCC and the ground voltage GND, respectively.

In this case, a signal for generating a clock and a signal for generating data may be detected according to a predetermined rule in the pixel circuit, and the pixel circuit may generate data and a clock according to a predetermined rule.

Specifically, according to an embodiment of the present invention, the clock line CL may transmit a first voltage signal, and the data line DL may transmit a second voltage signal.

For example, a clock line (CL) may transmit a supply voltage (VCC) with overlapping signals to a first voltage signal. data line (DL) may transmit a ground voltage (GND) as a second voltage signal.

In the pixel circuit according to an embodiment of the present invention, when the second voltage signal through the data line DL, that is, the ground voltage GND, is constant, the first voltage signal through the clock line CL, that is, the signal overlaps A relative voltage change of the supplied power voltage VCC may be detected.

When the second voltage signal through the data line DL, that is, the ground voltage GND is constant, the pixel circuit may detect a relative voltage change of the first voltage signal through the clock line CL, that is, the power voltage VCC on which the signal is superposed.

When the second voltage signal through the data line (DL) is constant, the pixel circuit may recognize a case as the first case (CASE 1) when the level of the first voltage signal through the clock line (CL) has fallen by the predetermined level.

In addition, when the second voltage signal through the data line (DL) is constant, the pixel circuit may recognize a case as a second case (CASE 2) when the first voltage signal level through the clock line (CL) rises by the predetermined level.

The pixel circuit may perform various operations, such as reset setting, data signal generation, and clock signal generation, depending on the case. For example, the pixel circuit may be configured to generate data when the first case is recognized, and to generate a clock when the second case is recognized.

The pixel circuit according to an embodiment of the present invention may transmit a reset signal, a data signal, and a clock signal to the serial flip-flop memory according to the above-described method. Accordingly, the number of contacts required to transmit a signal to the pixel circuit can be reduced. Furthermore, there is an effect that routing inside the pixel circuit can be simplified.

The controller 311, the clock generator 312, the data driver 313, and the bias voltage supply 315 may be formed in the form of a separate integrated circuit chip or one integrated circuit chip, and directly mounted on the substrate on which the pixel unit 110 are formed. Or the controller 311, the clock generator 312, the data driver 313, and the bias voltage supply 315 may be mounted on a flexible printed circuit film, attached to a substrate in the form of a tape carrier package (TCP), or formed directly on the substrate.

Figure 20:
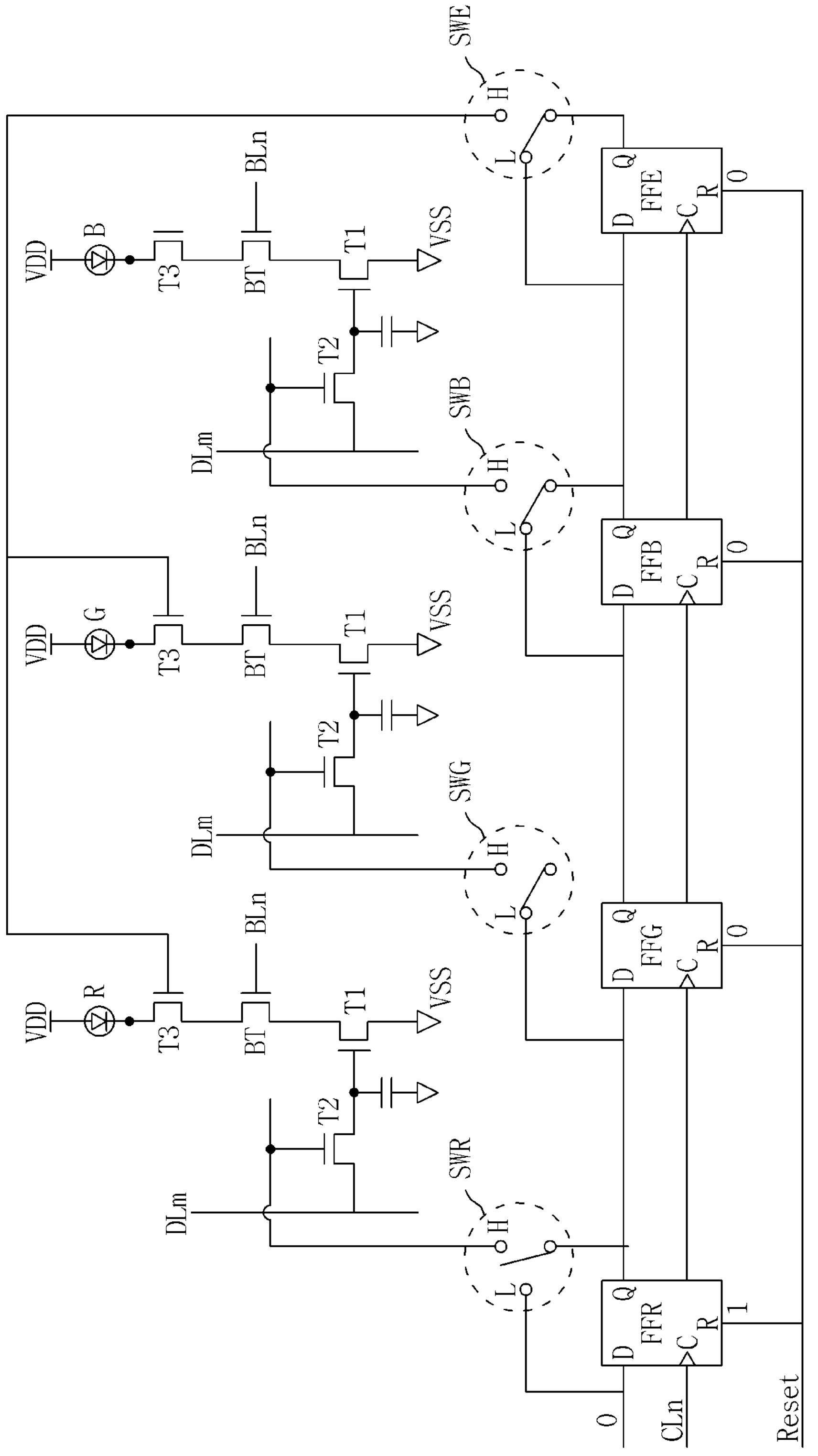
FIG. 20 and FIG. 21 are a diagram for explaining a method of serially processing a signal supplied to a sub-pixel according to an embodiment of the present invention.
Figure 21:
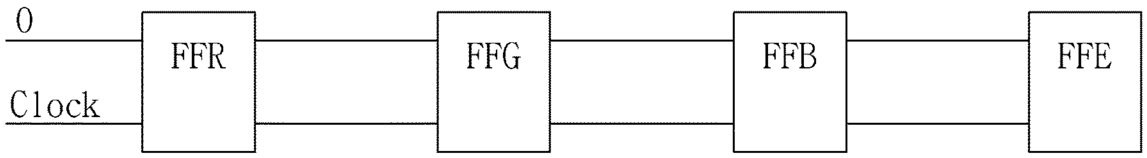

FIG. 20 and FIG. 21 are diagrams for explaining a method of serially processing a signal supplied to a sub-pixel according to an embodiment of the present invention.

In particular, FIG. 20 shows the structure of the flip-flop memory connected to the sub-pixel and sub-pixel circuits.

The pixel PX may include a light emitting diode LED and a pixel circuit connected to the light emitting diode LED. The pixel circuit may include first to third transistors T1 to T3, a bias transistor BT and a capacitor C. A first terminal of each of the first to third transistors T1 to T3 and the bias transistor BT may be a drain terminal, and a second terminal may be a source terminal.

The first transistor T1 has a gate terminal connected to the first terminal of the capacitor C, a first terminal connected to the light emitting diode ED through the third transistor T3, and a second terminal connected to the second power supply voltage VSS. It may include a terminal. The second power voltage VSS may be a ground voltage GND. The first transistor T1 serves as a driving transistor, and may receive a data signal according to a switching operation of the second transistor T2 to supply current to the light emitting diode ED. The first transistor T1 may operate in a low voltage region. For example, the first transistor T1 may operate in a triode region.

The second transistor T2 may include a gate terminal connected to the clock line CLn, a first terminal connected to the data line DLm, and a second terminal connected to the gate terminal of the first transistor T1. The second transistor T2 may be turned on based on the clock signal of the clock line CLn and served as a switching transistor to transfer the data signal transmitted to the data line DLm to the gate terminal of the first transistor T1. The second transistor T2 may be operated in a low voltage region together with the first transistor T1. The second transistor T1 may be operated in the triode region. In this case, the data signal may be converted into a voltage range corresponding to the low voltage operation of the first transistor T1 and the second transistor T2.

The third transistor T3 may include a gate terminal connected to the clock line CLn, a first terminal connected to the second electrode of the light emitting diode ED, and a second terminal connected to the first terminal of the bias transistor BT. have.

The third transistor T3 may be turned on based on the clock signal of the clock line CLn to serve as a switching transistor that allows the driving current of the first transistor T1 to flow through the light emitting diode ED. The bias transistor BT may include a gate terminal connected to the bias line BLn, a first terminal connected to the second terminal of the third transistor T3, and a second terminal connected to the first terminal of the first transistor T1. The bias transistor BT may be a voltage control transistor that maintains a turn-on state by a bias voltage applied to the gate terminal and may control the drain voltage of the first transistor T1. By controlling the drain voltage of the first transistor T1 by the bias transistor BT, the first transistor T1 and the second transistor T2 may serve as low voltage transistors. In one embodiment, the bias transistor (BT) may control the drain voltage of the first transistor (T1) so that the first transistor (T1) operates in the triode region.

The bias transistor BT may be turned on by a bias voltage applied through the bias line BLn. The bias voltage may be a DC voltage DC of a predetermined level that allows the bias transistor BT to always maintain a turned-on state. A node voltage between the first transistor T1 and the bias transistor BT, that is, a drain voltage of the first transistor T1 may be controlled according to the turn-on state of the bias transistor BT. The channel resistance of the bias transistor BT may vary according to the bias voltage. That is, the bias transistor BT may operate as a variable linear resistor.

A node voltage, that is, a drain voltage of the first transistor T1 may be determined according to a channel resistance of the bias transistor BT. Accordingly, by controlling the bias voltage, the drain voltage of the first transistor T1 may be controlled to a voltage that satisfies the condition that the first transistor T1 operates in the triode region.

The capacitor C may include a first terminal connected to the gate terminal of the first transistor T1 and a second terminal connected to the second power voltage VSS.

The first electrode of the light emitting diode ED may be supplied with the first power voltage VDD. The second electrode of the light emitting diode ED may be connected to the first electrode of the third transistor T3. The light emitting diode ED may display an image by emitting light with a luminance corresponding to the data signal.

On the other hand, the clock line (CLn) according to one embodiment of the present invention may be determined through the flip-flop memory to connect to the gate terminal of the gate terminal and the third transistor (T3) of the second transistor (T2) contained in each subpixel.

A pixel circuit may include a plurality of flip-flop units (FFR; Flip-Flop Red, FFG; Flip-Flop Green, FFB; Flip-Flop Blue, FFE; Flip-Flop Emission) are connected in series according to an embodiment of the present invention. It may include flop memory. Among the plurality of flip-flop units FFR, FFG, FFB, and FFE, some flip-flop units FFR, FFG, and FFB may be flip-flop units corresponding to sub-pixels, respectively, and some flip-flop portions (FFE) may be flip-flop controllers for controlling the luminescence of subpixels. Each flip-flop unit may include an input terminal D, an output terminal Q, a clock terminal C, and a reset terminal R.

The plurality of flip-flop units FFR, FFG, FFB, and FFE may be connected in series in a cascade form, and each flip-flop unit may receive a clock input through a clock line CLn. A signal may be output through the output terminal Q in response to a signal and/or a reset signal input through the reset line Reset according to an embodiment of the present invention.

For example, the switches SWR, SWG, SWB, and SWE may be turned on in response to a signal output from each flip-flop unit. Accordingly, the second transistor T2 and/or the third transistor T3 may be sequentially turned on.

Referring to FIG. 20 and FIG. 21, the reset signal RST 1, 0, 0, 0 may be input to the reset terminal R of each flip-flop unit. In this case, the FFR receiving the reset signal 1 may output a high level (H) signal through the output terminal Q, and in response thereto, the SWR may be turned on. Accordingly, the second transistor T2 of the red (R) sub-pixel may be turned on, and a data signal through the data line DLm may be programmed into a memory corresponding to the red (R) sub-pixel. At this time, the FFG, FFB, and FFE receiving the reset signal 0 may output a low-level (L) signal to the output terminal (Q), and the switches (SWG, SWB, SWE) respectively connected to the FFG, FFB, and FFE are turned off.

The flip-flop memory according to an embodiment of the present invention may sequentially shift the reset signal written in response to the clock signal along the flip-flop unit. That is, when the clock signal is input and one clock elapses, the reset signal RST 1, 0, 0, 0 may be shifted by one flip-flop along the cascaded flip-flop unit. At this time, the data value 0 is continuously input to the input terminal D of the FFR.

For example, when 1 clock has elapsed, values of 0, 1, 0, and 0 may be input to FFR, FFG, FFB, and FFE, respectively. At this time, the FFG receiving the reset signal 1 may output a high level (H) signal through the output terminal Q, and the SWG may be turned on in response thereto. Accordingly, the second transistor T2 of the green (G) sub-pixel may be turned on, and a data signal through the data line DLm may be programmed into a memory corresponding to the green (G) sub-pixel. At this time, the FFR, FFB, and FFE receiving the reset signal 0 may output a low-level (L) signal to the output terminal (Q), and the switches (SWR, SWB, SWE) respectively connected to the FFR, FFB, and FFE are turned off.

Similarly, when 2 clocks have elapsed after the reset signal is input, values of 0, 1, and 0 may be input to FFR, FFG, FFB, and FFE, respectively. In this case, the FFB receiving the reset signal 1 may output a high level (H) signal through the output terminal Q, and SWB may be turned on in response thereto. Accordingly, the second transistor T2 of the blue (B) sub-pixel may be turned on, and a data signal through the data line DLm may be programmed into a memory corresponding to the blue (B) sub-pixel. At this time, the FFR, FFG, and FFE receiving the reset signal 0 may output a low level (L) signal to the output terminal (Q), and the switches (SWR, SWG, SWE) respectively connected to the FFR, FFG, and FFE are turned off.

Thereafter, when 3 clocks have elapsed after the reset signal is input, values of 0, 0, and 1 may be input to FFR, FFG, FFB, and FFE, respectively. In this case, the FFE receiving the reset signal 1 may output a high level (H) signal through the output terminal Q, and SWE may be turned on in response thereto. Accordingly, the third transistor T3 of each sub-pixel may be turned on. That is, the light emitting diode of each sub-pixel may emit light with a luminance corresponding to a data signal programmed in each sub-pixel memory.

In the above-described embodiment, the time from when the reset signal is input until 2 clocks elapse may be a data writing period, and a time from when 3 clocks pass until the next reset signal is input may be a light emission period.

According to the above-described serial flip-flop memory embodiment, programming and light emission of each subpixel can be controlled only with a clock signal without supplying 3 scan signals and an emission control signal corresponding to each sub-pixel in parallel. It has the effect of controlling the programming and luminescence of each subpixel using only a clock signal.

Figure 22:
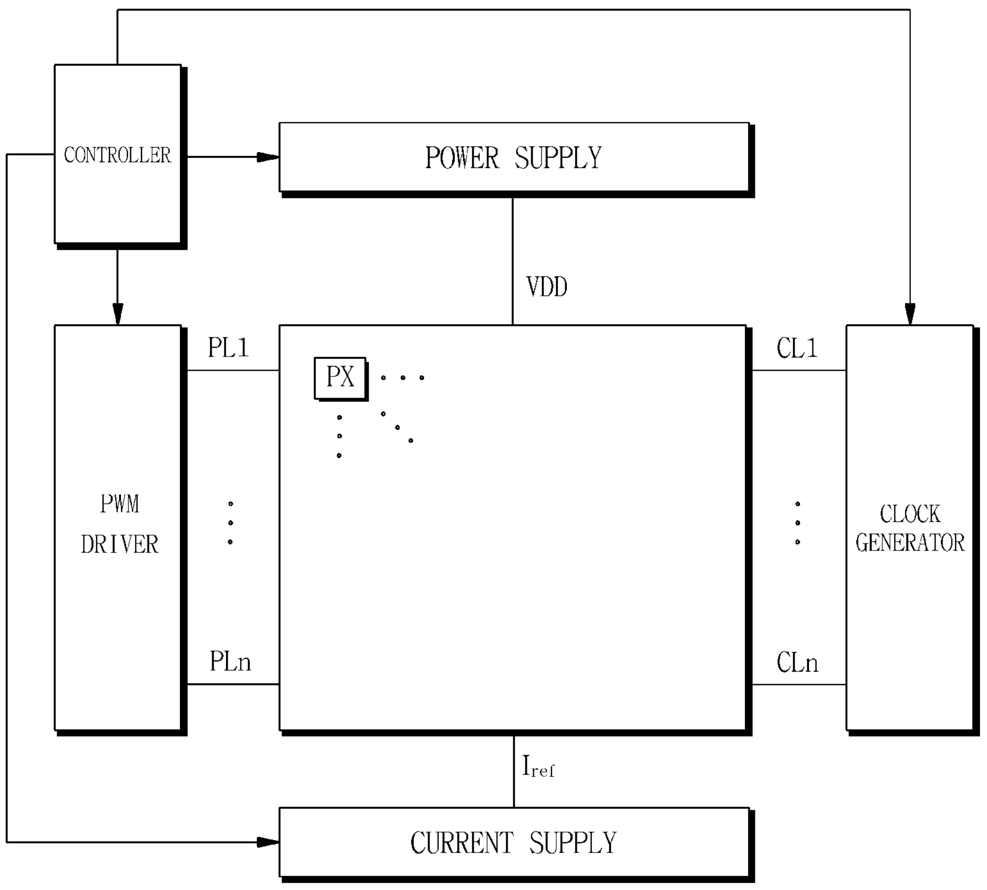
FIG. 22 is a schematic diagram showing a pulse-width modulation (PWM) driving display device.

FIG. 22 is a diagram schematically showing a PWM driving display device.

Referring to FIG. 22, the display device may include a display unit and a driving unit.

The display unit may be disposed in a display area displaying an image. The display unit may include a plurality of pixels PX arranged in various patterns such as a predetermined pattern, for example, a matrix type or a zigzag type. The pixel PX may emit one color, for example, one color among red, blue, green, and white. The pixel PX may emit colors other than red, blue, green, and white. The pixel PX may include a light emitting device. The light emitting device may be a self-luminous device. For example, the light emitting device may be a light emitting diode (LED).

The light emitting device may be a light emitting diode (LED) having a micro to nano unit size. The light emitting device may emit light at a single peak wavelength or may emit light at a plurality of peak wavelengths. The pixel PX may further include a pixel circuit connected to the light emitting device.

The pixel circuit may include at least one thin film transistor and at least one capacitor. The pixel circuit may be implemented by a semiconductor stacked structure on a substrate.

The display unit may include pulse lines PL1-PLn applying a PWM signal to the pixels PX and clock lines CL1-CLn applying a clock signal to the pixels PX. Each of the pulse lines PL1-PLn and the clock lines CL1-CLn is connected to the pixels PX arranged in the same row.

The driver may be provided in the non-display area around the display unit, and may drive and control the display unit. The driver may include a controller, a PWM driving unit, a current supply unit, a power supply unit, and a clock generation unit.

Under the control of the controller, the PWM driver may sequentially apply the PWM signal to the pulse lines PL1-PLn, and the current supply may apply the current Iref to each pixel PX. The pixels PX emit light with a brightness corresponding to the PWM signal received through the PWM driver.

The current supply may include a plurality of current sources that supply current to each column of the display unit. The power supply may generate the first power voltage VDD and apply it to the display unit. The power supply may generate a driving voltage and apply it to the PWM driver.

However, even in this case, pulse signals corresponding to a color depth corresponding to each sub-pixel are required in parallel, and a corresponding gray clock is required for PWM driving.

According to the above-described problem, the display device according to an embodiment of the present invention can simplify routing of signals required for a pixel circuit through a serial flip-flop memory for PWM driving.

Figure 23:
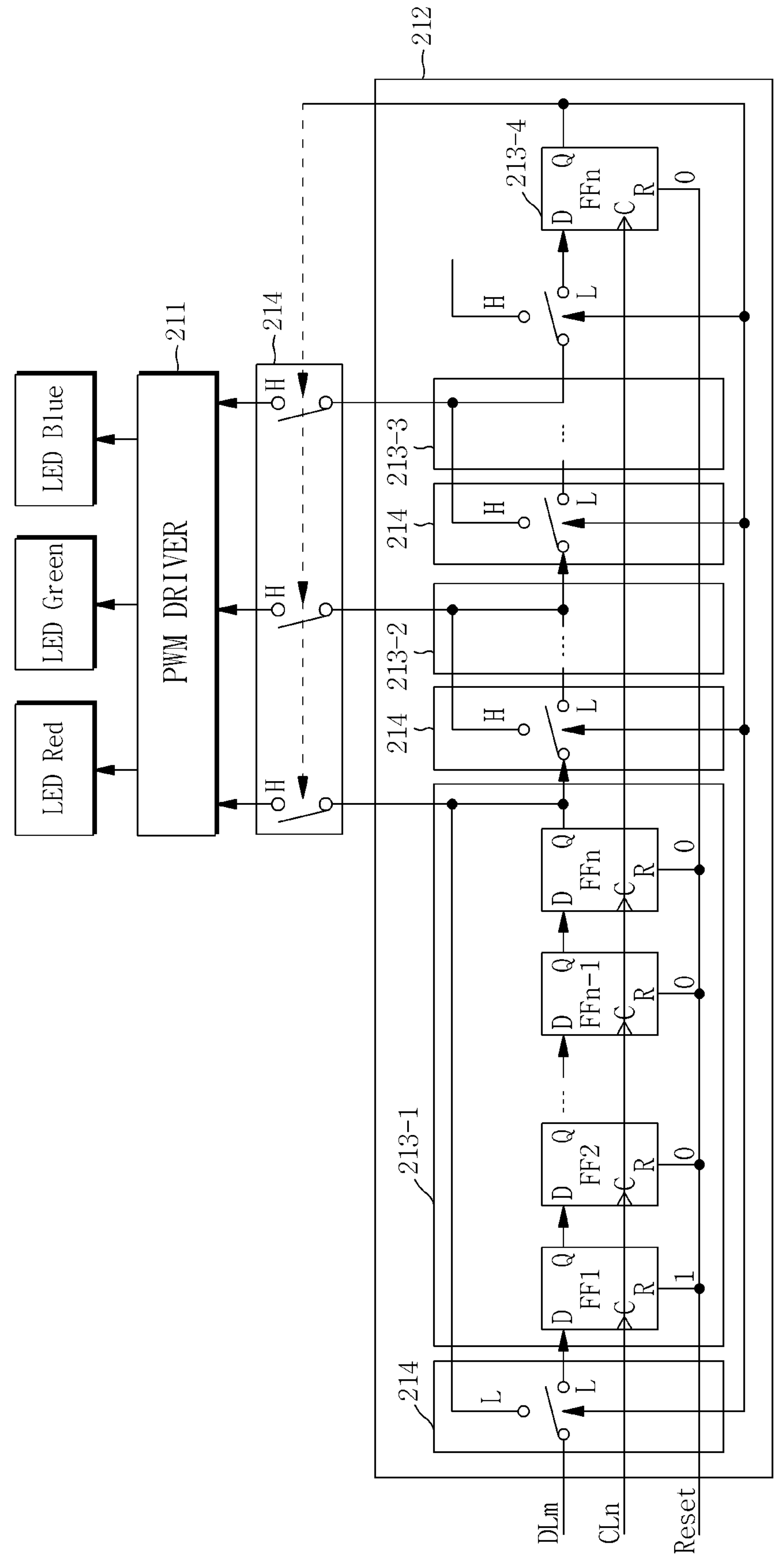
FIG. 23 and FIG. 24 is a diagram for explaining a method of serially processing a signal supplied to a sub-pixel according to an embodiment of the present invention.
Figure 24:
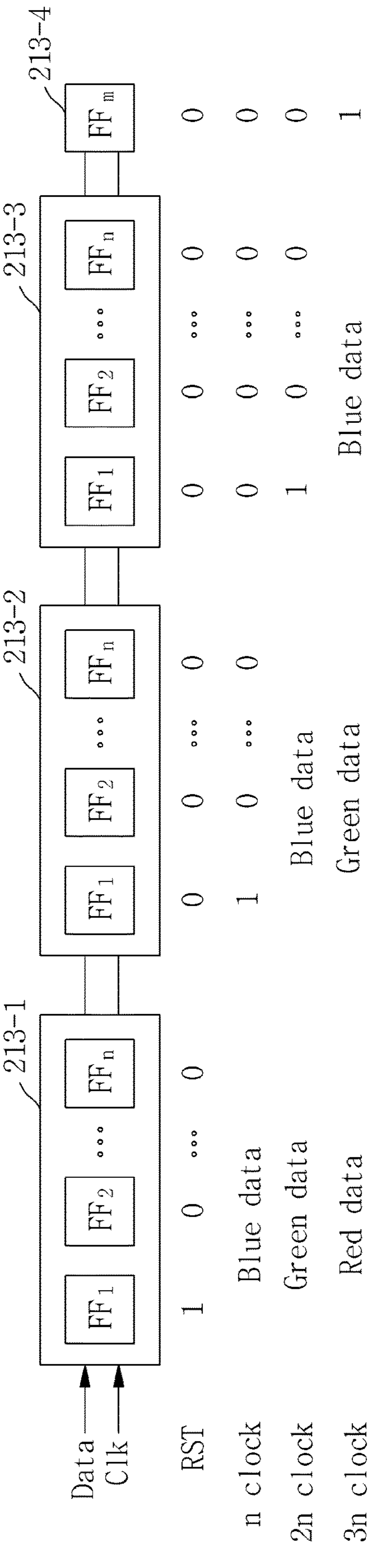

FIG. 23 and FIG. 24 are diagrams for explaining a method of serially processing a signal supplied to sub-pixels according to an embodiment of the present invention. In particular, FIG. 23 shows the structure of the flip-flop memory 212 connected to the sub-pixel and the PWM driver.

In particular, FIG. 23 shows the structure of the flip-flop memory 212 connected to the sub-pixel.

A display device according to an embodiment of the present invention includes a first flip-flop unit 213-1, a second flip-flop unit 213-2, a third flip-flop unit 213-3, and a fourth flip-flop unit 213-4 may be included. According to an embodiment of the present invention, the first flip-flop unit 213-1 to the fourth flip-flop unit 213-4 may be connected in a cascade form.

In this case, each flip-flop unit may include at least one flip-flop. In detail, each flip-flop unit may be one in which flip-flops as many as the number of bits for expressing a color depth of image data are serially connected. For example, the first flip-flop unit 213-1 may be implemented by serially connecting flip-flops FF1 to FFn by n bits corresponding to image data.

Each of the flip-flops FF1 to FFn and FFm may include an input terminal D, an output terminal Q, a clock terminal C, and a reset terminal R. Each flip-flop may output a signal through the output terminal Q in response to a clock signal input through the clock line CLn and/or a reset signal input through the reset line Reset.

According to an embodiment of the present invention, the switch 214 may be turned on in response to a signal output from the fourth flip-flop unit 213-4. Specifically, when a high level (H) value or 1 is inputted to the input terminal D and/or the reset terminal R of the fourth flip-flop unit 213-4, a high level (H) signal or 1 may be output through the output terminal D of the fourth flip-flop unit 213-4 to turn on the switch unit 214.

When the switch unit 214 is turned on, data stored in the first flip-flop unit 213-1 to the third flip-flop unit 213-3 may be output to the PWM driving unit 211. Specifically, when the switch unit 214 is turned on, a connection between the first flip-flop unit 213-1 and the data line DLm, a connection between the first flip-flop unit 213-1 and the second flip-flop unit 213-2, and a connection between the second flip-flop part 213-2 and the third flip-flop part 213-3 may be cut off, and each of the first flip-flop unit 213-1 to the third flip-flop unit 213-3 may be connected to the PWM driving unit 211.

In other words, before the high level (H) value or 1 is input to the fourth flip-flop unit 213-4, Data input through the data line DLm may be sequentially written to the first flip-flop unit 213-1 to the third flip-flop unit 213-3.

Referring to FIG. 23 and FIG. 24, reset signals RST 1,0 . . . ,0,0 may be input to each flip-flop reset terminal R included in the first flip-flop unit 213-1. Thereafter, when the clock signal is input and n clocks elapse, the written 1,0 . . . ,0,0 data may be shifted to the second flip-flop unit 213-2. Specifically, while n clocks pass, the 1,0 . . . ,0,0 signals written in may be shifted by one flip-flop corresponding to one clock-by-clock.

More specifically, the second flip-flop unit 213-2 also has n flip-flops of FF1 to FFn like the first flip-flop unit 213-1, the input terminal D of the FF1 of the second flip-flop unit 213-2 is connected to the output terminal Q of the FFn of the first flip-flop unit 213-1. That is, as one clock passes, the data written in the first flip-flop unit 213-1 may be shifted to the second flip-flop unit 213-2 by one bit.

According to an embodiment of the present invention, while the n clock passes, an n-bit data signal corresponding to blue LED light emission may be input to the input terminal D of the first flip-flop unit 213-1 through the data line DLm. Specifically, as one clock passes, the data written in the first flip-flop unit 213-1 may be shifted to the second flip-flop unit 213-2 by one bit, an n-bit data signal corresponding to blue LED light emission may be written into FF1 of the first flip-flop unit 213-1 bit by bit.

After n clocks have elapsed, all of the n-bit data written to the first flip-flop unit 213-1 is shifted to the second flop-flop unit 231-2, N-bit data (hereinafter, blue data) corresponding to blue LED light emission may be written in the first flip-flop unit 213-1.

When a clock signal is input and 2n clocks elapse, 1,0 . . . ,0,0 data written in the second flip-flop unit 213-2 may be shifted to the third flip-flop unit 213-3. Specifically, 1,0 . . . ,0,0 data written in the second flip-flop unit 213-2 may be shifted by 1 flip-flop corresponding to 1 clock-by-clock while 2n clocks pass from n clocks.

More specifically, the third flip-flop unit 213-3 also has n flip-flops FF1 to FFn, the input terminal D of the FF1 of the third flip-flop unit 213-3 is connected to the output terminal Q of the FFn of the second flip-flop unit 213-2. That is, as one clock passes, the data written in the second flip-flop unit 213-2 may be shifted to the third flip-flop unit 213-3 by one bit.

According to an embodiment of the present invention, while the n clock to $2^m$ clock passes, n corresponding to the green LED emission through the data line DLm to the input terminal D of the first flip-flop unit 213-1 A bit data signal (hereinafter, green data) may be input. Specifically, as one clock passes, the blue data written in the first flip-flop unit 213-1 may be shifted to the second flip-flop unit 213-2 by one bit, the 1,0 . . . ,0,0 signals written in the second flip-flop unit 231-2 may be shifted by 1 bit to the third flip-flop unit 231-3, and the n-bit green data may be written to FF1 of the first flip-flop unit 213-1 bit by bit.

As the clock signal is input and 3n clocks pass, the 1, 0 . . . , 0, 0 data written in may be shifted to the fourth flip-flop unit 213-4. Specifically, while the 2n clock to 3n clock passes, the 1,0 . . . ,0,0 signal inputted may be shifted by one flip-flop corresponding to one clock-by-clock.

According to an embodiment of the present invention, the fourth flip-flop unit 213-4 may have one flip-flop of FFm, the input terminal D of the FFm of the fourth flip-flop unit 213-4 is connected to the output terminal Q of the FFn of the third flip-flop unit 213-3. That is, as one clock passes, the data written in the third flip-flop unit 213-3 may be shifted to the fourth flip-flop unit 213-4 by one bit.

According to an embodiment of the present invention, while 2n clocks to 3n clocks pass, an n-bit data (hereinafter, red data) signal corresponding to red LED light emission may be input to the input terminal D of the first flip-flop unit 213-1 through the data line DLm. Specifically, as one clock passes, the data written in the third flip-flop unit 213-3 may be shifted to the fourth flip-flop unit 213-4 by one bit, blue data written in the second flip-flop unit 213-2 is shifted by 1 bit to the third flip-flop unit 213-3, Green data written in the first flip-flop unit 213-1 may be shifted by 1 bit to the second flip-flop unit 213-2.

After the 3n clock elapses, all n-bit data written to the third flip-flop unit 213-3 is shifted to the fourth flip-flop unit 213-4, and the red data is transferred to the first flip-flop unit 213-4. 213-1).

On the other hand, until 3n-1 clock passes from 2n clock, a plurality of 0 signals among the 1, 0 . . . , 0, 0 data shifted to the fourth flop-flop unit 213-4 are low-level (L) signals to maintain the OFF state of the switch unit 214. However, when the 3n clock elapses, 1 data among 1,0 . . . ,0,0 data may be written into the fourth flip-flop unit 213-4, 1 data may turn on the switch unit 214 as a high level (H) signal.

When the switch unit 214 is turned on, each of the first flip-flop units 213-1 to 213-3 may be connected to the PWM driving unit 211, and red data written in the first flip-flop unit 213-1, green data written in the second flip-flop unit 213-2, and blue data written in the third flip-flop unit 213-3 may be output to the PWM driver 211.

The PWM driving unit 211 may control the light emission of LED Red, LED Green, and LED Blue based on the input RGB data.

In the above-described embodiment, the time from when the reset signal is input until 2n clock elapses may be a data writing period, the time from when the 3n clock elapses until the next reset signal is input may be a light emission period or a PWM pulse signal generation period.

According to the above-described embodiment, the number of contacts required for signal transmission to each sub-pixel included in the pixel circuit can be reduced. That is, it may be possible to increase the yield and efficiency of transfer (Pick & Place) with a simplified contact structure.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random-access memory (RAM), a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements. The reception time maybe referred to as the ingress time The reception time maybe referred to as the ingress time. The transmission time referred to as the egress time.

While the detailed description in the disclosure has been shown with reference to certain embodiments thereof, it will be understood that various changes can be made therein without departing from the scope of the disclosure. Therefore, the scope of the disclosure should not be defined as being limited to the described embodiments, but should be defined by the appended claims and equivalents thereof.

What is claimed is:

1. A display device comprising:

a display unit including a plurality of pixels;

a signal controller generating a first voltage signal and a second voltage signal;

a column driver connected to each of the pixels to transmit the first voltage signal to the pixel through a column line; and a row driver connected to each of the pixels to transmit the second voltage signal to the pixel through a row line, wherein the signal controller generates the second voltage signal such that a voltage level of the second voltage signal rises more than a predetermined level value during a non-emission period of the pixel, and wherein the predetermined level value is less than a minimum level value of the first voltage signal and greater than or equal to maximum level value of the second voltage signal.

2. The display device of claim 1, wherein the first voltage signal is a first signal superimposed on a power supply voltage, and the second voltage signal is a ground voltage superimposed with a second signal.

3. The display device of claim 2, wherein the first signal is an analog data signal, the second signal is a switch clock signal.

4. The display device of claim 3, the signal controller generates the second voltage signal such that the voltage level of the second voltage signal rises more than the predetermined level value during the non-emission period of the pixel based on a predetermined duty ratio.

5. The display device of claim 2, wherein the first signal is a signal for data generation, the second signal is a clock generation signal.

6. The display device of claim 5, the signal controller generates the second voltage signal such that the voltage level of the second voltage signal rises more than the predetermined level value during the non-emission period of the pixel based on a predetermined duty ratio.

7. The display device according to claim 1, wherein the non-emission period is a period excluding a data writing period and a light emission period in a frame period of the pixel.

8. A driver for driving and controlling a plurality of pixels comprising:

a signal controller generating a first voltage signal and a second voltage signal;

a column driver connected to each of the pixels to transmit the first voltage signal to the pixel through a column line; and a row driver connected to each of the pixels to transmit the second voltage signal to the pixel through a row line, wherein the signal controller generates the second voltage signal such that a voltage level of the second voltage signal rises more than a predetermined level value during a non-emission period of the pixel, and wherein the predetermined level value is less than a minimum level value of the first voltage signal and greater than or equal to maximum level value of the second voltage signal.

* * * * *